United States Patent
Wijnands et al.

(10) Patent No.: US 9,942,053 B2
(45) Date of Patent: *Apr. 10, 2018

(54) BIT INDEXED EXPLICIT REPLICATION USING INTERNET PROTOCOL VERSION 6

(71) Applicant: CISCO TECHNOLOGY, INC., San Jose, CA (US)

(72) Inventors: Ijsbrand Wijnands, Leuven (BE); Gregory J. Shepherd, Eugene, OR (US); Nagendra Kumar Nainar, Morrisville, NC (US); Christian Martin, Rumson, NJ (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 14/488,810

(22) Filed: Sep. 17, 2014

(65) Prior Publication Data

US 2015/0078379 A1     Mar. 19, 2015

Related U.S. Application Data

(60) Provisional application No. 61/878,693, filed on Sep. 17, 2013, provisional application No. 61/931,473, filed on Jan. 24, 2014.

(51) Int. Cl.
*H04L 12/18* (2006.01)
*H04L 12/761* (2013.01)
(Continued)

(52) U.S. Cl.
CPC .......... *H04L 12/18* (2013.01); *H04L 12/1886* (2013.01); *H04L 45/16* (2013.01);
(Continued)

(58) Field of Classification Search
None
See application file for complete search history.

(56) References Cited

U.S. PATENT DOCUMENTS

| | | | |
|---|---|---|---|
| 5,764,624 A | 6/1998 | Endo | 370/218 |
| 5,999,531 A | 12/1999 | Ferolito | 370/390 |
| (Continued) | | | |

FOREIGN PATENT DOCUMENTS

| | | | | |
|---|---|---|---|---|
| CN | 101572667 | 11/2009 | ............. | H04L 12/56 |
| CN | 102025538 | 4/2011 | | |
| WO | WO 2007/095331 | 8/2007 | ..................... | 370/390 |

OTHER PUBLICATIONS

IPv6 Addressing (Tech Ref),Microsoft, Apr. 3, 2011, pp. 1-30 http://technet.microsoft.com/en-us/library/dd392266(v=ws.10).aspx.*

(Continued)

*Primary Examiner* — Chirag Shah
*Assistant Examiner* — Amar Persaud
(74) *Attorney, Agent, or Firm* — Campbell Stephenson LLP

(57) ABSTRACT

Various systems and methods for performing bit indexed explicit replication (BIER) using IPv6. For example, one method involves receiving, at a node, a packet that includes an IP header. The packet also includes a multicast forwarding entry. The method also involves comparing the multicast forwarding entry with forwarding information stored by the node and selecting a neighbor based on the comparing. The method further includes forwarding the packet to the neighbor.

11 Claims, 14 Drawing Sheets

US 9,942,053 B2

Page 2

(51) Int. Cl.
*H04L 12/741* (2013.01)
*H04L 12/723* (2013.01)
*H04L 12/705* (2013.01)

(52) U.S. Cl.
CPC .............. *H04L 45/74* (2013.01); *H04L 45/18* (2013.01); *H04L 45/50* (2013.01)

(56) References Cited

U.S. PATENT DOCUMENTS

| | | | | |
|---|---|---|---|---|
| 6,148,000 | A | 11/2000 | Feldman | 370/394 |
| 6,240,188 | B1 | 5/2001 | Dondeti | 380/259 |
| 6,615,336 | B1 | 9/2003 | Chen | 711/202 |
| 6,771,673 | B1 | 8/2004 | Baum | 370/535 |
| 7,111,101 | B1* | 9/2006 | Bourke | H04L 49/101 326/40 |
| 7,519,733 | B1 | 4/2009 | Thubert | 709/232 |
| 7,551,599 | B2 | 6/2009 | Levit | 370/254 |
| 7,925,778 | B1 | 4/2011 | Wijnands | 370/389 |
| 8,320,374 | B2 | 11/2012 | de Heer | 370/390 |
| 8,325,726 | B2 | 12/2012 | Baban et al. | 370/390 |
| 8,774,179 | B1 | 7/2014 | Gaggara | 370/389 |
| 8,787,400 | B1 | 7/2014 | Barth | 370/419 |
| 8,848,728 | B1* | 9/2014 | Revah | H04L 47/125 370/386 |
| 8,942,256 | B1 | 1/2015 | Barth | 370/469 |
| 9,065,766 | B2 | 6/2015 | Matsuoka | |
| 2002/0126661 | A1* | 9/2002 | Ngai | H04L 12/42 370/380 |
| 2002/0191628 | A1 | 12/2002 | Liu | 370/428 |
| 2003/0043802 | A1 | 3/2003 | Yazaki | 370/389 |
| 2003/0142685 | A1 | 7/2003 | Bare | 370/410 |
| 2003/0210695 | A1* | 11/2003 | Henrion | H04L 45/00 370/392 |
| 2004/0264374 | A1 | 12/2004 | Yu | 370/230 |
| 2005/0169270 | A1 | 8/2005 | Mutou | 370/390 |
| 2006/0182035 | A1 | 8/2006 | Vasseur | 370/238 |
| 2006/0280192 | A1* | 12/2006 | Desanti | H04L 12/18 370/409 |
| 2007/0127474 | A1 | 6/2007 | Mirtorabi et al. | 370/390 |
| 2007/0189291 | A1 | 8/2007 | Tian | 370/390 |
| 2008/0159285 | A1* | 7/2008 | de Heer | H04L 12/18 370/390 |
| 2008/0165783 | A1* | 7/2008 | Desanti | H04L 63/06 370/392 |
| 2009/0067348 | A1 | 3/2009 | Vasseur | 370/256 |
| 2009/0219817 | A1 | 9/2009 | Carley | 370/235 |
| 2009/0310610 | A1 | 12/2009 | Sandstrom | 370/394 |
| 2010/0046515 | A1 | 2/2010 | Wong | 370/390 |
| 2011/0202761 | A1 | 8/2011 | Sarela et al. | 716/163 |
| 2011/0228770 | A1 | 9/2011 | Dholakia | 370/390 |
| 2011/0274112 | A1* | 11/2011 | Czaszar | H04L 63/0227 370/392 |
| 2012/0099591 | A1 | 4/2012 | Kotha | 370/392 |
| 2012/0243539 | A1* | 9/2012 | Keesara | H04L 45/66 370/392 |
| 2013/0034097 | A1 | 2/2013 | Dharmapurikar | 370/390 |
| 2013/0114595 | A1 | 5/2013 | Mack-Crane | 370/390 |
| 2013/0114619 | A1 | 5/2013 | Wakumoto | 370/406 |
| 2013/0136117 | A1* | 5/2013 | Schrum, Jr. | H04W 88/06 370/338 |
| 2013/0201988 | A1 | 8/2013 | Zhou | 370/390 |
| 2013/0308948 | A1* | 11/2013 | Swinkels | H04B 10/27 398/66 |
| 2013/0336315 | A1 | 12/2013 | Guichard | 370/389 |
| 2013/0343384 | A1* | 12/2013 | Shepherd | H04L 12/18 370/390 |
| 2014/0010223 | A1 | 1/2014 | Wang | 370/338 |
| 2014/0043964 | A1 | 2/2014 | Gabriel | 370/229 |
| 2014/0098813 | A1 | 4/2014 | Mishra | 370/390 |
| 2014/0119191 | A1 | 5/2014 | Onoue | 370/236 |
| 2014/0160925 | A1 | 6/2014 | Xu | 370/235 |
| 2015/0003458 | A1 | 1/2015 | Li | 370/392 |
| 2015/0023328 | A1 | 1/2015 | Thubert et al. | 370/336 |
| 2015/0049760 | A1* | 2/2015 | Xu | H04L 45/16 370/390 |
| 2015/0078377 | A1 | 3/2015 | Wijnands et al. | 370/390 |
| 2015/0078378 | A1 | 3/2015 | Wijnands et al. | 370/390 |
| 2015/0078380 | A1 | 3/2015 | Wijnands et al. | 370/390 |
| 2015/0085635 | A1 | 3/2015 | Wijnands et al. | 370/216 |
| 2015/0131658 | A1 | 5/2015 | Wijnands et al. | 370/390 |
| 2015/0131659 | A1 | 5/2015 | Wijnands et al. | 370/390 |
| 2015/0131660 | A1 | 5/2015 | Wijnands et al. | 370/390 |
| 2015/0138961 | A1 | 5/2015 | Wijnands et al. | 370/228 |
| 2015/0139228 | A1 | 5/2015 | Wijnands et al. | 370/390 |
| 2015/0181309 | A1 | 6/2015 | Wijnands et al. | 725/109 |
| 2015/0334006 | A1 | 11/2015 | Shao | 370/225 |
| 2016/0142248 | A1 | 5/2016 | Thubert et al. | 370/372 |
| 2017/0099232 | A1 | 4/2017 | Shepherd | 370/390 |

OTHER PUBLICATIONS

Eckert, Toerless et al., "Failure Protection for Traffic-Engineered Bit Indexed Explicit Replication", U.S. Appl. No. 15/054,480, filed Feb. 26, 2016; consisting of Specification, Claims, Abstract, and Drawings (76 pages).

Das, Kaushik, "IPv6 Header Deconstructed"; http://www.ipv6.com/articles/general/IPv6-Header.htm; Apr. 18, 2008; 2 pages.

Aggarwal, R., et al., "BGP Encodings and Procedures for Multicast in MPLS/BGP IP VPNs," Internet Engineering Task Force (IETF), Request for Comments 6514, Feb. 2012, pp. 1-59.

Artel Video Systems, White Paper; "The Broadcaster's Guide to SMPTE 2022: Applications in Video Contribution and Distribution," Oct. 2014, pp. 1-7.

Bates, T. et al., "Multiprotocol Extensions for BGP-4," Network Working Group, Request for Comments 4760. Jan. 2007, pp. 1-12.

Boivie, Rick, and N. Feldman. IBM Watson Research Center; "Small Group Multicast," draft-boivic-sgm-02.tx4 Internet-Draft, Feb. 2001, pp. 1-17.

Boivie, Rick, et al., "Explicit Multicast (Xcast) Concepts and Options, draft-ooms-xcast-basic-spec-13.txt," Internet-Draft, Jul. 2007, pp. 1-34.

Cisco Systems, Inc., "Multi-Topology Routing," Feb. 2007, pp. 1-72.

Cisco Systems, Inc., White Paper. "Diffserv—The Scalable End-to-End Quality of Service Model," Aug. 2005, pp. 1-18.

Deering, S., Cisco Systems, Inc. and R. Hinden, Nokia, "Internet Protocol, Version 6 (IPv6)," Network Working Group. Request for Comments 2460, Dec. 1998, pp. 1-39.

Gharai, L. et al., "RTP Payload Format for Society of Motion Picture and Television Engineers (SMPTE) 292M Video," Network Working Group, Request for Comments 3497, Mar. 2003, pp. 1-12.

Hinden, R., Nokia and S. Deering, Cisco Systems, Inc., "IP Version 6 Addressing Architecture," Network Working Group, Request for Comments 4291, Feb. 2006, pp. 1-25.

Kompella, K. et al., "The Use of Entropy Labels in MPLS Forwarding," Internet Engineering Task Force (IETF), Request for Comments 6790, Nov. 2012, pp. 1-25.

Kumar, N. et al., Cisco Systems, Inc., "OSPF Extension for Bit Index Explicit Replication, draft-kumar-ospf-bier-extension-00," Internet-Draft, May 19, 2014, pp. 1-7.

Kumar, N., et al., "BIER Use Cases, draft-kumar-bier-use-cases-00." Network Working Group, Internet—Draft, Oct. 25, 2014, pp. 1-7.

Laabs, Matthias, "SDI over IP—Seamless Signal Switching in SMPTE 2022-6 and a Novel Multicast Routing Concept," EBU Technical Review, 2012 Q4, pp. 1-7.

Przygienda, T. et al.. "M-ISIS: Topology (MT) Routing in Intermediate System to Intermediate Systems (IS-ISs)," Network Working Group, Request for Comments 5120, Feb. 2008, pp. 1-14.

Psenak, P. et al., "Multi-Topology (MT) Routing in OSPF," Network Working Group, Request for Comments 4915, Jun. 2007, pp. 1-20.

Psenak, P. et al., Cisco Systems; "OSPF Extensions for BIER, draft-psenak-ospf-bier-extensions-00," OSPF, Internet-Draft, Sep. 27, 2014, pp. 1-6.

(56) References Cited

OTHER PUBLICATIONS

Psenak, P. et al., Cisco Systems; "OSPF Extensions for BIER, draft-psenak-ospf-bier-extensions-01," OSPF, Internet-Draft, Oct. 24, 2014, pp. 1-8.
Rekhter, Ed. Y. et al.. "A Border Gateway Protocol 4 (BGP-4)," Network Working Group, Request for Comments 4271, Jan. 2006, pp. 1-104.
Rosen, Ed. E. et al., "Multicast VPN Using BIER, draft-rosen-13vpn-mvpn-bier-01." Internet Engineering Task Force, Internet—Draft, Oct. 16, 2014, pp. 1-9.
Schulzrinne, H. et al.,; "RTP: A Transport Protocol for Real-Time Applications," Network Working Group, Request for Comments 3550, Jul. 2003. pages 1-89.
SMPTE, "Beyond the Digital Conversion, The Integration of Information Technology and Professional Media, The Convergence of 2 Industries—The Adoption of Information Technology by the Professional Media Industry: Report of the SMPTE Study Group on Media Production System Network Architecture," Mar. 31, 2014, ©2014 by the Society of Motion Picture and Television Engineers, Inc. (SMPTE), pp. 1-65.
SMPTE, "Transport of High Bit Rate Media Signals Over IP Networks (HBRMT)," ST 2022-6:2012, © 2015 by the Society of Motion Picture and Television Engineers, Inc. (SMPTE), p. 1.
SMPTE, "Definition of Vertical Interval Switching Point for Synchronous Video Switching," RP 168:2009, © 2015 by the Society of Motion Picture and Television Engineers, Inc. (SMPTE), p. 1.
Whitcomb, Leigh, "Real-Time Professional Broadcast Signals Over IP Networks," Harris Corporation, Technology Conference, Apr. 2011, pp. 1-60.
Wijnands, Ijsbrand, et al., Cisco Systems, Inc.; "Multipoint Label Distribution Protocol In-Band Signaling in a VPN Context, draft-wijnands-mpls-mldp-vpn-in-band-signaling-00," Internet-Draft. Oct. 7, 2011, pp. 1-13.
Wijnands, Ijsbrand, Cisco Systems. Inc., "Bit Index Explicit Replication using MPLS Encapsulation, draft-wijnands-mpls-bmf-encapsulation-00," Internet-Draft, Feb. 2014, pp. 1-9.
Wijnands, Ijsbrand, et al., "Multicast Using Bit Index Explicit Replication. draft-wijnands-bier-architecture-01." Internet Engineering Task Force, Internet-Draft, Oct. 16, 2014, pp. 1-24.
Wijnands, Ijsbrand, et al., "Multicast Using Bit Index Explicit Replication, draft-wijnands-bier-architecture-02," Internet Engineering Task Force, Internet-Draft, Dec. 4, 2014, pp. 1-27.
Xu, X. et al., "BIER Encapsulation. draft-xu-bier-encapsulation-00," Network Working Group, Internet-Draft. Sep. 30, 2014, pp. 1-6.
Xu, X. et al., "BIER Encapsulation, draft-xu-bier-encapsulation-01," Network Working Group, Internet-Draft, Oct. 20, 2014, pp. 1-6.
Aguilar, L., "Datagram Routing for Internet Multicasting," SRI International, Menlo Park, California, ACM SIGCOMM Computer Communication Review Newsletter, vol. 14, Issue 2, Jun. 1984, pp. 58-63.
Eckert, T., "Traffic Engineering for Bit Index Explicit Replication BIER-TE, draft-eckert-bier-te-arch-00," Network Working Group, Internet—Draft, Mar. 5, 2015, pp. 1-21.
Eckert, T., et al., "Traffic Engineering for Bit Index Explicit Replication BIER-TE, draft-eckert-bier-te-arch-01," Network Working Group, Internet—Draft, Jul. 5, 2015, pp. 1-23.
Yongliang Li, et al., Abstract Translation of CN-201010573400-A and CN 102025538, Database EPODOC [Online], European Patent Office, Apr. 20, 2011, pp. 1-2 [XP 002740355 on Extended EP SR].
Eckert, Toerless et al., "Traffic Engineering for Bit Indexed Explicit Replication", U.S. Appl. No. 14/814,574, filed Jul. 31, 2015; consisting of Specification, Claims, and Abstract (75 pages); and Drawings (18 sheets).
Eckert, Toerless et al., "Traffic Engineering for Bit Indexed Explicit Replication", U.S. Appl. No. 14/862,915, filed Sep. 23, 2015; consisting of Specification, Claims, and Abstract (75 pages); and Drawings (18 sheets).
Wijnands, Ijsbrand, et al., "Multicast Using Bit Index Explicit Replication, draft-wijnands-bier-architecture-03," Internet Engineering Task Force, Internet-Draft, Jan. 27, 2015; pp. 1-29.
Yongliang Li, et al., Abstract Translation of CN-201010573400-A and CN 102025538, Database EPODOC [Online], European Patent Office, dated Apr. 20, 2011, pp. 1-2 [XP 002740355 on Extended EP SR].
Wang, Xiaorong et al.,et al., "Internet Protocol Based Encapsulation for Bit Indexed Explicit Replication (BIER)"; U.S. Appl. No. 15/487,626, filed Apr. 14, 2017; consisting of Specification, Claims, Abstract, and Drawings (94 pages).
Wijnands, Ijsbrand et al., "Unicast Media Replication Fabric Using Bit Indexed Explicit Replication," U.S. Appl. No. 15/581,806, filed Apr. 28, 2017; consisting of Specification, Claims, Abstract, and Drawings (64 pages).
Wijnands, Ijsbrand et al., "Bridging of Non-Capable Subnetworks in Bit Indexed Explicit Replication," U.S. Appl. No. 15/582,090, filed Apr. 28, 2017; consisting of Specification, Claims, Abstract, and Drawings (68 pages).
Wijnands, Ijsbrand et al., "Area Specific Broadcasting Using Bit Indexed Explicit Replication"; U.S. Appl. No. 15/347,443, filed Nov. 9, 2016; consisting of Specification, Claims, Abstract, and Drawings (65 pages).
Wang, Xiaorong et al., "Multicast Traffic Steering Using Tree Identity in Bit Indexed Explicit Replication (BIER)," U.S. Appl. No. 15/474,583, filed Mar. 30, 2017; consisting of Specification, Claims, Abstract, and Drawings (97 pages).

\* cited by examiner

800

| Bit Routing Table A | | |
|---|---|---|
| RID | Set:BP | NBR |
| D/32 | 0:1 | B |
| F/32 | 0:2 | B |
| C/32 | -- | B |
| E/32 | 1:1 | B |
| B/32 | -- | B |

| Bit Routing Table B | | |
|---|---|---|
| RID | Set:BP | NBR |
| D/32 | 0:1 | C |
| F/32 | 0:2 | C |
| C/32 | -- | C |
| E/32 | 1:1 | E |
| A/32 | 0:3 | A |

| Bit Forwarding Table A |||||
|---|---|---|---|---|
| Set | BP | BM | NBR ||
| 0 | 1 | 0011 | B ||
|  | 2 | 0011 | B ||
| 1 | 1 | 0001 | B ||

| Bit Forwarding Table B ||||
|---|---|---|---|
| Set | BP | BM | NBR |
| 0 | 1 | 0011 | C |
|  | 2 | 0011 | C |
|  | 3 | 0100 | A |
| 1 | 1 | 0001 | E |

FIG. 10B

BIT INDEXED EXPLICIT REPLICATION USING INTERNET PROTOCOL VERSION 6

RELATED APPLICATIONS

This application claims the domestic benefit under Title 35 of the United States Code § 119(e) of U.S. Provisional Patent Application Ser. No. 61/878,693 entitled "Multicast IPv6 with Bit Mask Forwarding" filed Sep. 17, 2013, and U.S. Provisional Patent Application Ser. No. 61/931,473 entitled "Bit Mask Forwarding Architectures for Stateless Multipoint Replication" filed Jan. 24, 2014, both of which are hereby incorporated by reference in their entirety and for all purposes as if completely and fully set forth herein.

BACKGROUND

Network nodes forward data. Network nodes may take form in one or more routers, one or more bridges, one or more switches, one or more servers, or any other suitable communications processing device. The data is commonly formatted as packets and forwarded using forwarding tables. A packet is a formatted unit of data that typically contains control information and payload data. Control information may include: information that identifies sources and destinations, such as addresses, error detection codes like checksums, sequencing information, etc. Control information is typically found in packet headers and trailers. Payload data is typically located between the packet headers and trailers.

Forwarding packets involves various processes that, while simple in concept, can be complex. The processes involved in forwarding packets vary, depending on the type of forwarding method used. Multicast is the preferred method of data forwarding for many networks. One reason for this is that multicast is a bandwidth-conserving technology that reduces traffic by simultaneously delivering data to multiple receivers. However, in traditional multicast systems, a relatively large amount of control plane information is used. Setting up and maintaining this control information has a tendency to become complex and costly in terms of computing resources, and can become a major limiting factor in overall network performance. Another issue with multicast is that due to packet delivery mechanisms used, packets are sometimes forwarded to locations where the packets were not desired. This unnecessary delivery of packets represents an unwelcome burden on network performance. Overcoming this burden by traditional means involves generation and maintenance of even more control plane information.

BRIEF DESCRIPTION OF THE DRAWINGS

The present disclosure may be better understood, and its numerous objects, features, and advantages made apparent to those skilled in the art by referencing the accompanying drawings.

FIG. 8A is an example table generated by node of FIG. 2.

FIG. 8B is an example table generated by node of FIG. 2.

FIG. 10A is an example table generated by node of FIG. 2.

FIG. 10B is an example table generated by node of FIG. 2.

DETAILED DESCRIPTION

Overview

Various systems and methods for performing bit indexed explicit replication (BIER) using IPv6. For example, one method involves receiving, at a node, a packet that includes an IP header. The packet also includes a multicast forwarding entry. The method also involves comparing the multicast forwarding entry with forwarding information stored by the node and selecting a neighbor based on the comparing. The method further includes forwarding the packet to the neighbor.

Multicast

Multicast delivers multicast data packets (data packets that traditionally include information identifying a multicast group, such as a multicast group address) from a source to multiple receivers without unduly burdening the source. As used herein, the term "receiver" signifies a host (such as a computing device or application) that has subscribed to a multicast group. Instead of the source replicating a multicast data packet and sending a copy of the multicast data packet to each receiver, the source sends a single copy of a multicast data packet and multicast-enabled routers (referred to herein simply as nodes) replicate the packet at the point(s) where paths to various receivers diverge. Multicast routing protocols enable multicast transmission (i.e., one-to-many connections and many-to-many connections) by replicating a multicast data packet close to the destination of that multicast data packet, obviating the use of multiple unicast connections for the same purpose. This saves network bandwidth and improves throughput.

Figure 1:
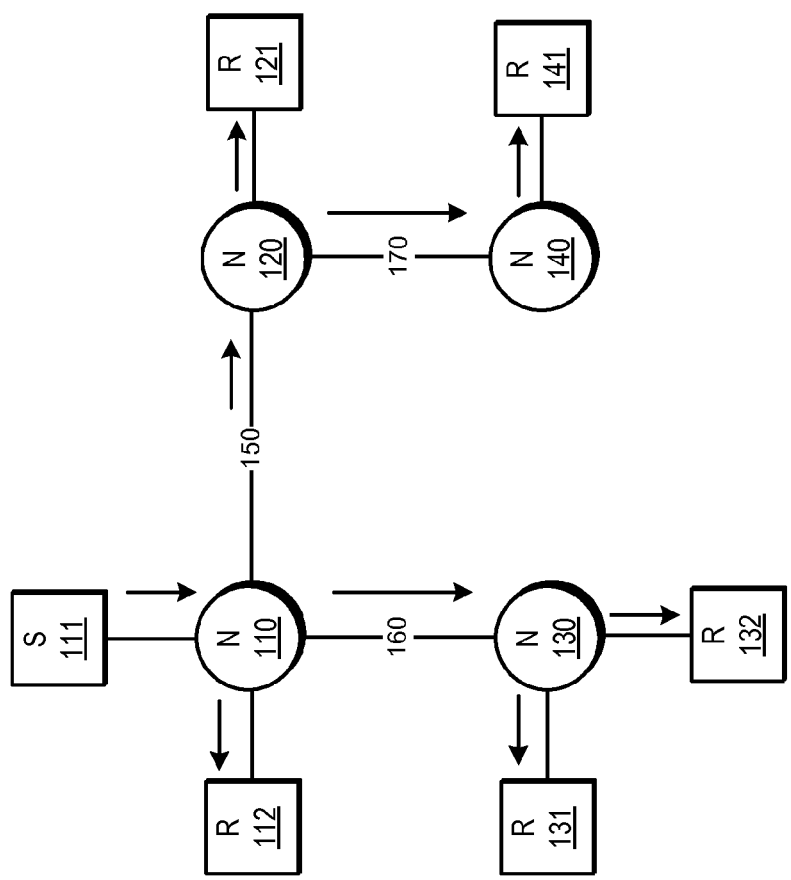
FIG. 1 is a simplified block diagram illustrating certain components of an example network.

FIG. 1 is a simplified block diagram of a network 100 performing multicast data transmission. Multicast-enabled nodes 110, 120, 130 and 140 are coupled through network links 150, 160, and 170. Multicast-enabled node 110 is also coupled to source 111 and receiver 112; multicast-enabled node 120 is coupled to receiver 121; multicast-enabled node 130 is coupled to receiver 131 and receiver 132; and multicast-enabled node 140 is coupled to receiver 141. Such coupling between the multicast-enabled nodes and the sources and/or receivers can be direct or indirect (e.g., via a L2 network device or another node).

For the purposes of this illustration, source 111 is a host configured to transmit multicast data packets to a multicast group that includes as receivers hosts 112, 121, 131, 132 and 141. Source 111 transmits a multicast flow, consisting of one or more multicast data packets having a common multicast group address, to multicast-enabled node 110 (illustrated by the arrow from 111 to 110). Multicast-enabled node 110 includes a multicast forwarding table that multicast-enabled node 110 uses to determine where to forward the multicast data packets associated with the multicast flow. The multicast forwarding table includes information identifying each interface of multicast-enabled node 110 that is connected to a multicast distribution tree (MDT) to one or more receivers for the multicast group (e.g., a host that has sent a join message, as described above). Multicast-enabled node 110 then replicates multicast data packets in the multicast flow and transmits the replicated multicast data packets from the identified interfaces to receiver 112, multicast-enabled node 120, and multicast-enabled node 130.

Multicast-enabled nodes 120 and 130 inform node 110 that they are coupled to one or more receivers using join messages, for example, a protocol independent multicast (PIM) join message. In response to receiving the join messages, multicast-enabled node 110 updates its multicast forwarding tables to identify interfaces to which multicast data packets should be forwarded. The multicast data packets can be replicated by node 110 as needed in order to provide the multicast data packets to receivers for the multicast group (e.g., receivers 131 and 132) and other multicast-enabled nodes on the MDT (e.g., multicast-enabled node 140). In this manner, a multicast flow from source 111 can be transmitted through a multicast network to multiple receivers.

As can be seen, the process traditionally used in multicast of setting up MDTs and updating multicast forwarding tables for each group results in considerable amounts of state information within the network. The multicast forwarding tables maintained by each multicast-enabled node, in particular, can become quite large. Maintaining such multicast forwarding tables represents limitations on network scalability.

Internet Protocol

Traditionally, Internet Protocol (IP) routing uses IP forwarding tables, which are created at nodes using information distributed between nodes via one or more protocols like the interior gateway protocol (IGP) and/or the border gateway protocol (BGP). In simple terms, IP forwarding tables map destination addresses to the next hops that packets take to reach their destinations. When a node receives a packet, the node can access a forwarding table using the destination address in the packet and lookup a corresponding egress interface for the next hop. The node then forwards the packet through the egress interface. The next hop that receives the packet performs its own forwarding table lookup using the same destination IP address, and so on. In the case of using IP to forward multicast data packets, the multicast data packets include a multicast group address in the destination address field.

IPv6 is a version of IP routing that improves upon previous versions. For example, IPv4 uses 32-bit addresses. IPv6, on the other hand, uses 128-bit addresses, which significantly increases the number of addresses that can be assigned to network devices. Another feature provided by IPv6 is the capability to define extension headers. Extension headers are optional headers used to carry additional information in a packet header. Extension headers are placed in the packet between the fixed IPv6 header and an upper-layer protocol header (e.g., a TCP header).

Bit Indexed Explicit Replication

As described below, techniques are used to attach receiver information to packets in the form of bits and forward the packets based on the receiver information. This greatly reduces the amount of state information stored at nodes and is therefore also referred to as "stateless multicast." More formally, the term Bit Indexed Explicit Replication (BIER) is used to describe these techniques. As suggested by the term, a bit position is used as an index into a forwarding table and packets are replicated only to specified nodes. The following describes BIER using IPv6. It should be understood that BIER is not limited to any particular routing protocol.

To use BIER in an IP network, that is, a network that utilizes IPv6, modifications are made to the IPv6 data plane that allow a bit mask (BM) to be encoded in an IPv6 header of a multicast data packet. Multicast data packets are forwarded according to the BM. In one embodiment, this is accomplished by encoding the BM using bits from the IPv6 source and/or destination address fields. In another embodiment, the extension headers provided by IPv6 are used to encode the BM.

Figure 2:
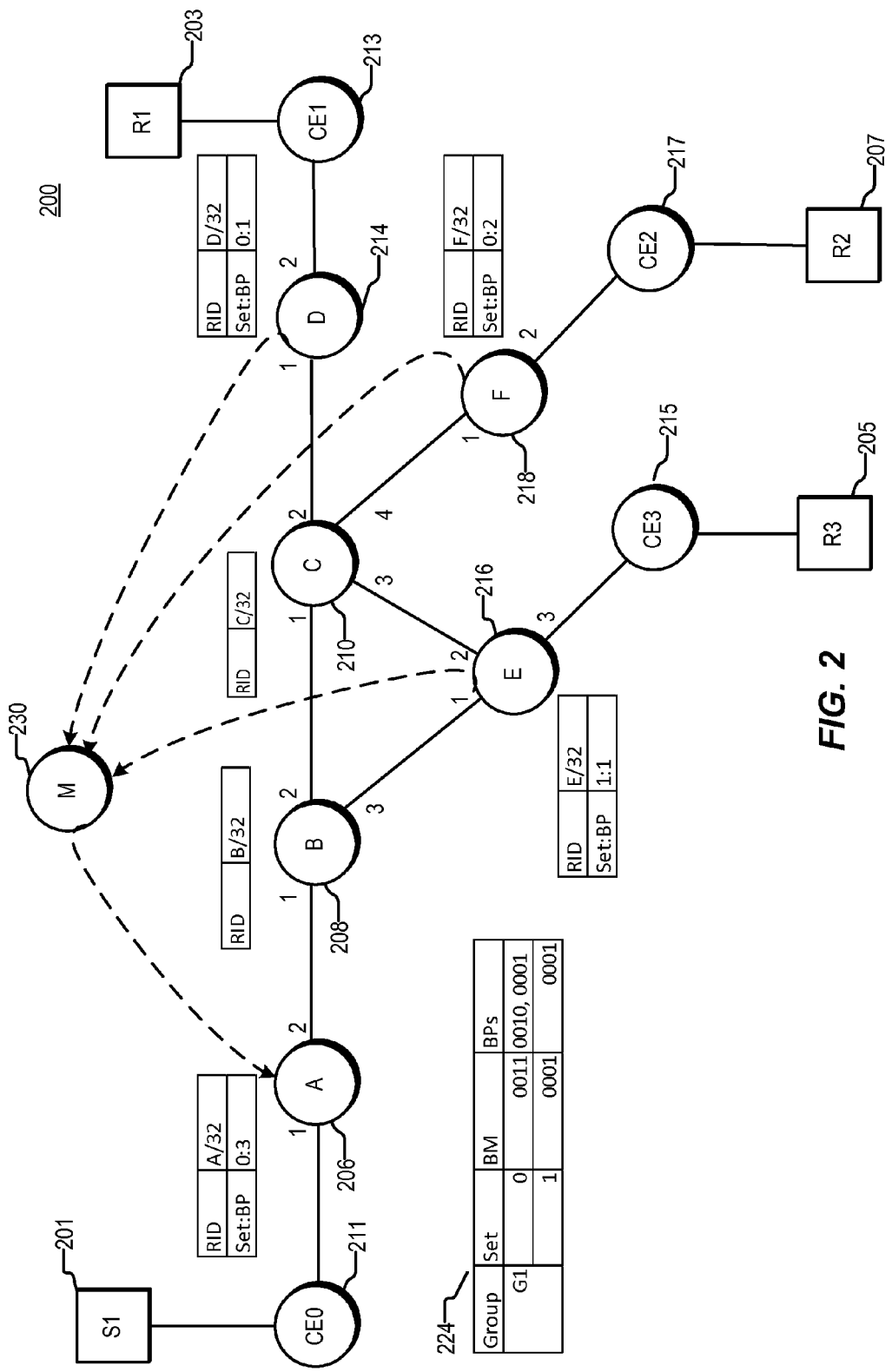
FIG. 2 is a simplified block diagram illustrating certain components of an example network.

FIG. 2 shows an example network 200. Network 200 includes BIER-enabled nodes 206-218. BIER-enabled nodes are configured to forward packets using BIER. BIER-enabled nodes 206-218 form a provider network, or domain. Such a provider network could be employed by an Internet service provider to transport packets to customers. The domain includes core nodes 208 and 210, and provider edge nodes 206, 214, 216, and 218. The provider edge nodes are coupled to customer edge nodes 211, 213, 215, and 217. Hosts 201, 203, 205, and 207 are computing devices coupled to the customer edge nodes.

Each of the BIER-enabled nodes 206-218 has interfaces that are identified as shown. For example, BIER-enabled node 208 has three interfaces designated 1-3, respectively. Each BIER-enabled node is assigned a unique identifier or routable address known as a router identifier (RID). The RID can be implemented as, for example, an internet protocol (IP) address, a prefix, or a loopback address. Each BIER-enabled node advertises or floods the routable address to all other BIER-enabled nodes in network 200. Each BIER-enabled node builds a unicast topology of the BIER-enabled nodes in network 200 using the advertised routable addresses. BIER network 200 also includes a node configured to operate as a multicast data controller (MDC) 230. In one embodiment, the MDC performs configuration and administrative tasks, as described below.

BIER-enabled node 206 is configured as an ingress router (IR) for multicast data packets. BIER-enabled node 206 is coupled, via customer edge node 211, to source 201. Multicast data packets from source 201 enter the BIER network via the IR (BIER-enabled node 206). Each of BIER-enabled nodes 214, 216, and 218 is configured as an egress router (ER). The ERs can be connected (directly or via customer edge routers) to hosts, such as receivers, or other networks. An ER is a BIER-enabled node that is the last BIER-enabled node on a path between a source and a receiver. The ER may be a provider edge (PE) node that is coupled to the receiver either directly or indirectly (e.g., through a non-BIER-enabled CE node).

Assigning a Bit Position in the Bit Mask

Each ER in a BIER network is assigned a unique bit position (BP) from a bit mask (BM). As used herein, the term bit mask refers to a set of bits that has a fixed or variable length. Each BP in the BM identifies at least one BIER-enabled node. The length of the BM used in the BIER network can be statically configured or dynamically assigned and distributed through the BIER network. In one embodiment, the length of the BM is between 80 and 1024 bits. The maximum length of the BM value is determined, in one embodiment, by hardware or software limitations of the BIER-enabled nodes in the BIER network. In one embodiment, different BIER-enabled nodes in the BIER network use different lengths for their respective BMs. For example, one BIER-enabled node may have a maximum BM length of 128 bits while another BIER-enabled node may have a maximum BM length of 256 bits. Mechanisms to handle such non-homogenous BM sizes are described below. Also described below are various approaches to accommodate BIER networks where the number of ERs exceeds the maximum number of bits in the BM. A bit mask is one type of multicast forwarding entry in which each bit position of multiple bit positions is an element that can be used to represent an individual node or interface. Other types of multicast forwarding entries with other types of entries can be used.

A bit position (BP) assigned to an ER is statically or dynamically assigned to the ER. Each ER should have at least one unique bit position from the BM. In one embodiment, a central authority, such as MDC 230, will assign the BPs to the ERs. The controller, in one embodiment, assigns multiple BPs to a single ER, e.g., a unique BP for each of one or more interfaces included in the ER. Other mechanisms for assigning BPs can be implemented as well, such as deriving a BP from a router identifier assigned to a BIER-enabled node, where the derivation utilizes a mapping algorithm. In some embodiments, a bit position in the BM is assigned to a single ER. In other embodiments, a single BP can be assigned to more than one ER. When multiple ERs are assigned the same BP, one of the multiple ERs can assume ownership of the BP at a given time, and ownership can be transferred between the multiple ERs. Ownership of the BP can be transferred to another one of the multiple ERs for any of several reasons, such as a failover in response to a node or link failure, or if one of the multiple ERs otherwise becomes unavailable, in response to changing network conditions, due to time-sharing considerations, and the like. Assigning one BP to multiple ERs facilitates operation similar to anycast, in which packets are forwarded to one receiver of a group of receivers, where each receiver in the group of receivers uses a common address. Only the ERs in a BIER network are assigned a BP. All other BIER-enabled nodes in the network don't need a BP to participate in BIER. This helps to reduce the number of bits assigned in a network.

Sets

The number of ERs that can be addressed (assigned a BP) is limited by the size of the BM included in the multicast data packet. The concept of sets allows an increase in the number of ERs that can be assigned BPs. The set identifier (SI) is a number that allows a BP to be unique in the context of a set. For example, each BP can be re-used in each set. In an embodiment with 16 sets and a BM length of 80 bits, 1280 (16×80) ERs can be supported. In one embodiment, BIER-enabled nodes in the BIER network generate separate forwarding information for each SI. For example, if two different set identifiers are in use in the BIER network, the BIER-enabled nodes generate two bit forwarding tables (BFTs), one corresponding to each SI. In response to receiving a multicast data packet having a SI, the BIER-enabled node uses the SI to select which forwarding information (e.g., BFT or portion of a BFT) to use to forward the multicast data packet. As shown in the example of FIG. 2, each of the three ERs in network 200 is assigned a SI:BP pair: node 214 is assigned BP 1 in set 0; node 216 is assigned BP 1 in set 1; node 218 is assigned BP 2 in set 0; and node 206 is assigned BP 3 in set 0.

In addition to extending the number of ERs that can be assigned unique BPs, sets can also be used in the context of multi-topology routing (MTR) or to enable temporal slicing. For example, a set of BPs can be assigned to a group of ERs. The ERs use the assigned BPs for a specified time period. A second set of BPs is also assigned to the ERs. The second set of BPs is used for a second time period. In an embodiment implemented in a dual plane network, the controller can assign one plane a first SI and the second plane a second SI. In one embodiment, BPs within a set are assigned to ERs based on geographic proximity to other ERs in the set.

A controller, such as MDC 230 of FIG. 2, can determine that conditions exist to switch from forwarding packets using BPs in one set to another. For example, the controller can detect expiration of a specified time period, or receive a signal to switch between topologies in an MTR environment. In one embodiment, the controller centrally determines clustering of ERs within an aggregate collection of transported multicast flows and dynamically assigns and reassigns a SI and BP to all affected ERs. This enables a larger number of ERs to be addressed by a smaller BM. To switch sets, the controller indicates which SI and BM the IR should include in outgoing packets. Based on the SI, BIER-enabled nodes in the network will select a BFT or portion of a BFT associated with the SI, and forward packets accordingly.

In one embodiment, the SI is included as part of the BM encoding in a multicast data packet. There are a number of methods that can be used to implement sets that facilitate determining the SI from the packet. The methods vary based at least in part on the type of encapsulation used to carry the BM value. For example, if IPv6 is used, each SI could correspond to a unique value identified by a field in the IPv6 header. In one embodiment, if ERs that have signaled interest in a given multicast flow have different SIs, then the IR sends a copy of the multicast data packet for each SI.

The above description makes clear that a BP can be unique in the context of a domain, or BIER network, or can be unique to a given set. In one embodiment, BPs are unique within the context of an area, or any other logical or physical division of a given BIER network. If a BIER network is divided into multiple areas, each area containing only a portion of the BIER-enabled nodes in the entire BIER network, assigning BPs on the basis of area results in being able to use a smaller number of unique BPs.

Virtual Bit Position

One way of utilizing sets uses the concept of a virtual bit position (VBP). Each ER is assigned a VBP, e.g., by a controller, as discussed above. If the number of ERs in a BIER network exceeds the maximum BM length, the BP for additional ERs is mapped to a {Set:BP} identifier. Consider an example where the BM length is 256. If 256 ERs have been assigned VBPs 1-256, the BM is used up. When another ER is assigned VBP 257, VBP 257 corresponds to {1:1}. If the BM length were 128 (instead of 256), the VBP 257 would correspond to {2:1}. One advantage of this model is that sets are automatically used to increase the number of ERs that can be uniquely identified based on the available BM size. If a longer BM size becomes available in the network, there is no need for the operator to reconfigure the ERs. The VBP and SI are signaled through the BIER network using IGP and are associated with the ER's routable address.

Advertising

In response to a BP being assigned to an ER, the ER advertises its BP along with its router identifier, to some or all of the other nodes in the BIER network. In one embodiment, the ER advertises its BP via an interior gateway protocol (IGP). For example, Intermediate System to Intermediate System (ISIS) and/or Open Shortest Path First (OSPF) can be modified to assist in distributing this information through the BIER network using link state updates. Other flooding mechanisms to distribute the information are possible. All BIER-enabled nodes in a BIER network, not just the ERs, also flood their router identifier, which is used in building network topology and unicast forwarding tables. BIER-enabled nodes, in one embodiment, advertise additional information as well, such as a bit mask size that the BIER-enabled node is configured to use. Adding such BIER information to the advertised information is a relatively small amount of additional information, as compared with the state information maintained on a per-group basis in traditional multicast.

Figure 3:
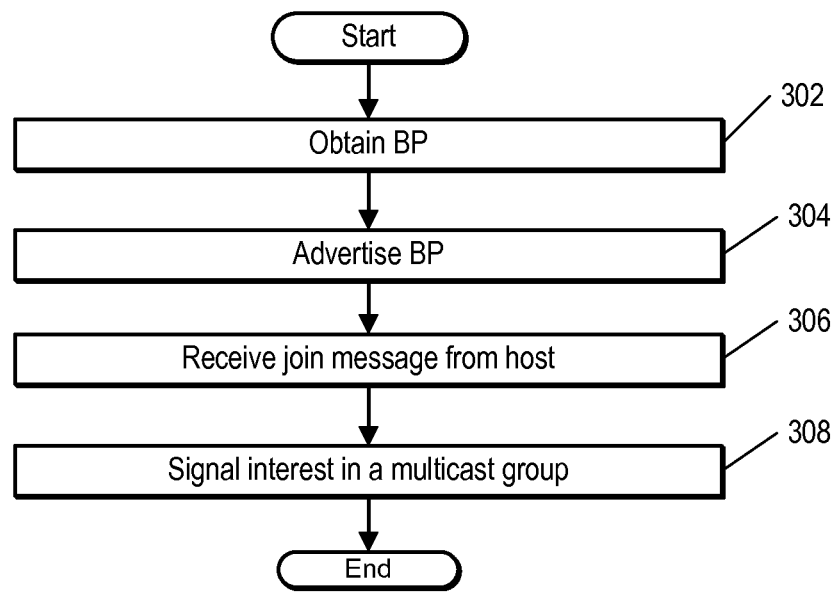
FIG. 3 is a flowchart showing an example process performed by BIER-enabled node in a BIER network.

FIG. 3 is a flowchart showing an example process performed by a BIER-enabled node in a BIER network. In one embodiment, the method is performed by an egress router (ER), such as BIER-enabled node 214 of FIG. 2. At 302, the ER obtains a bit position (BP) and, optionally, a set identifier (SI). In one embodiment, the ER sends a request for a BP to a controller, such as MDC 230 of FIG. 2. The BP can be received automatically in response to the ER joining the BIER network, or can be received in response to the BIER-enabled node signaling an intent to participate in BIER. In one embodiment, BPs are assigned according to an arbitrary sequence, and the controller determines the next available BP and assigns the next available BP to the ER. For example, the controller can assign BP 0 to the first ER to join the BIER network, BP 1 to the second ER to join the BIER network, and so on. In one embodiment, the BPs can be derived from router IDs of the BIER-enabled nodes using a mapping algorithm. For example, the BP can be based on the last digit of network prefix associated with the ER.

At 304, the BIER-enabled node advertises its BP. In some embodiments, the BIER-enabled node also advertises additional BIER information, such as its router identifier, maximum bit mask size, and set identifier. As noted, the BIER-enabled node uses, in one embodiment, an IGP to advertise this information, such as an opaque link state advertisement (LSA) of OSPF. Any available mechanism for transmitting information between the BIER-enabled nodes can be used to advertise the BP.

At 306, the ER receives a join message from a host, such as host 203 of FIG. 2. The join message signifies that the host wishes to receive packets associated with a multicast group. The host can be directly coupled to the ER or indirectly coupled through one or more intervening network elements, such as a customer edge node. In one embodiment, the join message is an IGMP message that includes information identifying the multicast group the host is interested in and, in some cases, a source associated with the multicast group. Receiving a join message is one example of how an ER can learn that a host to which it is coupled is interested in a multicast group. Other methods are possible. For example, the ER could learn that a particular host or type of host has come online or connected to the ER and automatically determine that the host should be subscribed to one or more multicast groups.

In response to receiving the join message or otherwise learning that the host wishes to join the multicast group, the ER signals its interest in the multicast group specified by the join message at 308. In one embodiment, the ER first determines whether the ER has already signaled an interest in the multicast group, in which case, the ER foregoes additional signaling. If the ER does not have a current interest registered with an IR for the multicast group, the ER sends a message to one or more IRs and/or candidate IRs expressing an interest in the multicast group. This is referred to as overlay signaling. Overlay signaling can be implemented using various techniques, such as border gateway protocol (BGP) messages, software (SDN) networks mechanisms, or any other available mechanism for providing one-to-many control signaling between multicast sources and receivers. While the example used refers to an ER sending a signaling message to an IR, the ER could also, or in the alternative, send the signaling message to the controller or some other intermediate control entity. The controller then passes on information indicating the ER's interest to one or more IRs and/or sources.

Figure 4A:
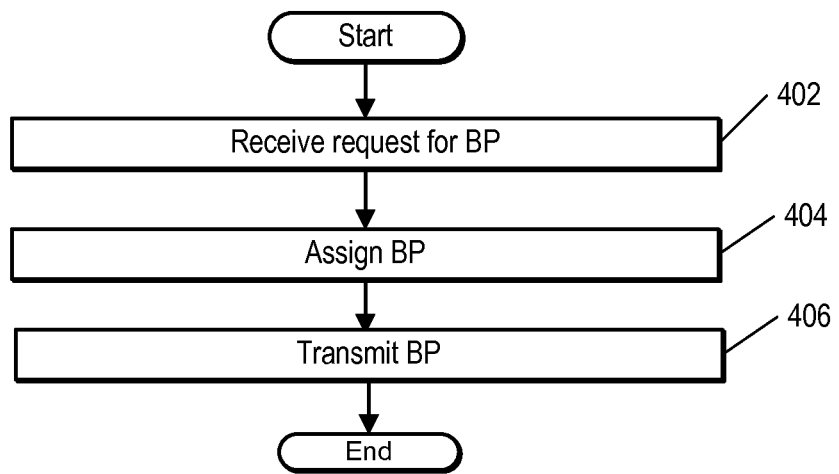
FIG. 4A is a flowchart showing an example process performed by controller in a BIER network.

FIG. 4A is a flowchart showing an example process performed by controller in a BIER network. In one embodiment, the method is performed by a multicast data controller (MDC), such as MDC 230 of FIG. 2. At 402, the controller receives a request for a bit position. In one embodiment, the request is received from an ER.

At 404, the controller assigns a set identifier (SI) and/or bit position (BP) to the ER. For example, the controller determines the previous set identifier and bit position that were assigned and assigns the next available pit position and set identifier to the ER. If for example, bit position 256 was the last bit position assigned, the controller can select bit position 257 as the next bit position. In one embodiment, the bit position and set identifier are implemented as a virtual bit position. In another embodiment, the controller utilizes a SI:BP combination. For example, if the maximum BM size an ER uses is 256, instead of assigning bit position 257, the controller assigns the ER the SI:BP of {1:1}. That is, the controller assigns the ER BP 1 in the second set (SI 1).

In one embodiment, rather than selecting the next available bit position, the controller assigns bit position based on other factors, such as proximity (geographic and/or otherwise) to other egress routers, and the like. At 406, the controller encapsulates the assigned bit position and set identifier (optionally) into a message and transmits the message to the egress router that requested the bit position.

Figure 4B:
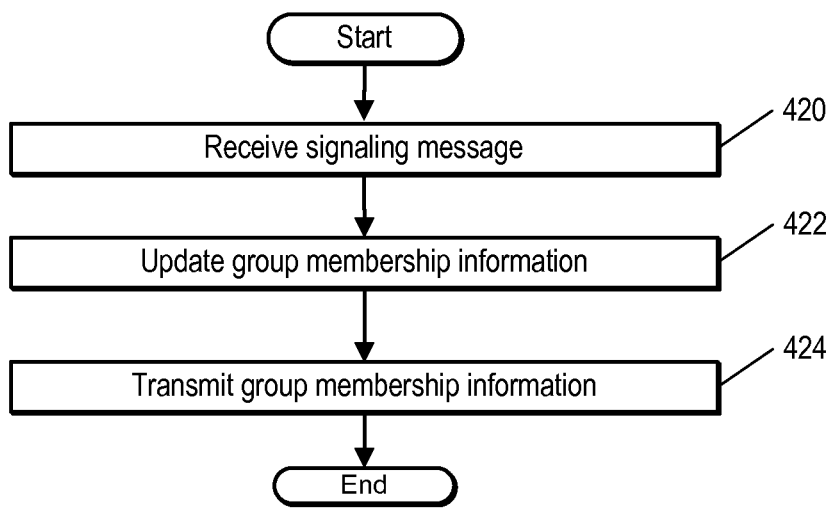
FIG. 4B is a flowchart showing an example process performed by controller in a BIER network.

FIG. 4B is a flowchart showing an example process performed by controller in a BIER network. In one embodiment, the method is performed by a multicast data controller (MDC), such as MDC 230 of FIG. 2. At 420, the controller receives a signaling message. In one embodiment, the controller receives the signaling message from an egress router via BGP, or some other overlay signaling protocol. The signaling message indicates that the egress router that originated the signaling message wishes to either begin receiving or cease receiving multicast data packet associated with a multicast group identified by information in the signaling message.

At 422, in response to receiving the signaling message, the controller updates group membership information. In one embodiment, the controller maintains a group membership table (GMT), such as GMT 224 of FIG. 2. In response to receiving the signaling message, the controller adds (or removes) information identifying the set identifier and bit position of the egress router that originated the signaling message. In one embodiment, rather than the controller creating and maintaining a group membership table, the group membership table is created and maintained by an ingress router or a host. When the GMT is created and maintained by an IR or host, the controller forwards the signaling information to the IR or host that creates and maintains the GMT. In one embodiment, the BIER network does not include a controller, and the signaling message is sent directly from the egress router to the ingress router or host that creates and maintains the GMT.

Signaling messages are shown in FIG. 2 as dashed lines. In the example of FIG. 2, BIER-enabled nodes E, F, and D have each expressed an interest in joining a particular multicast group G1 by sending signaling messages to MDC 230. MDC 230 has updated GMT 224 to show that those three BIER-enabled nodes are interested in G1. MDC 230 has also forwarded the GMT to BIER-enabled node A, which is an IR coupled to host 201, which is a source for multicast group G1.

Figure 5:
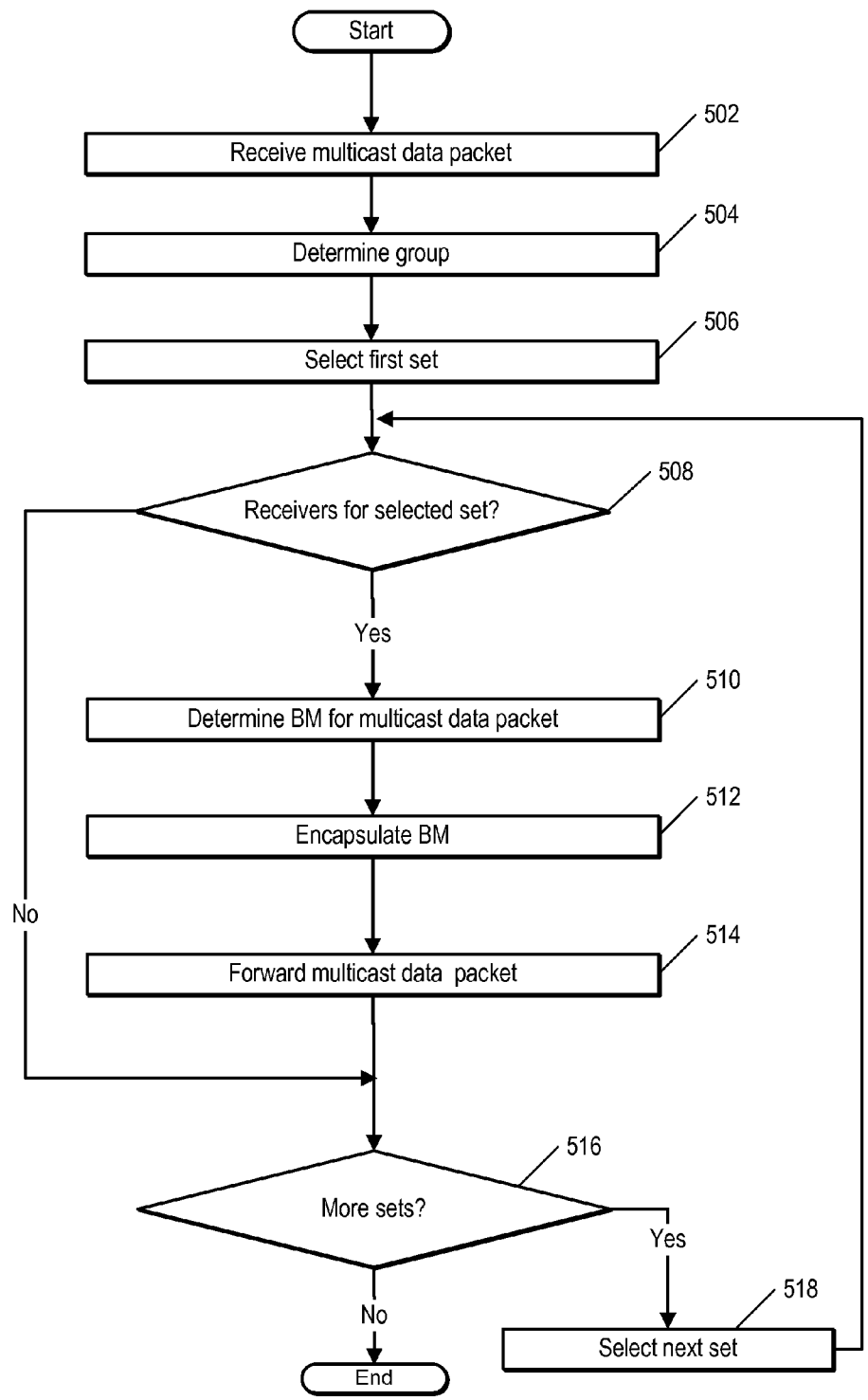
FIG. 5 is a flowchart showing an example process performed by BIER-enabled node in a BIER network.

FIG. 5 is a flowchart showing an example process performed by a BIER-enabled node in a BIER network. In one embodiment, the method is performed by an ingress router (IR), such as BIER-enabled node 206 of FIG. 2. While described as being performed by an IR, the method shown in FIG. 5 could be performed by a host, or other computing device either included in a BIER network or outside of a BIER network.

At 502, the IR receives a multicast data packet that includes information (e.g., a multicast group address and/or source address) identifying a multicast group or flow. In one embodiment, the multicast data packet is received from a host, such as host 201 of FIG. 2, configured to act as a source for the multicast group. The source can be directly coupled to the IR, or indirectly coupled through one or more intervening network elements, such as a CE node.

At 504, the IR determines the multicast group that the multicast data packet belongs to. In one embodiment, this involves looking up the multicast group address in the multicast data packet. For example, in IPv6, the multicast group is traditionally encapsulated in the destination address (DA) field of the IPv6 header of a multicast data packet. The IR uses the multicast group information to determine which BM information should be added to the multicast data packet(s) that the IR forwards for this multicast group. In one embodiment, the IR forwards one multicast data packet for each set which has at least one ER that has signaled interest in the multicast group. At 506, the IR selects the first set in the GMT that has ERs which have signaled interest in the multicast group. Alternatively, the IR can select the first set (e.g., set 0) and sequentially determine whether a multicast data packet should be forwarded for that set. At 508, the IR determines whether its GMT indicates that receivers (e.g., ERs) in the selected set have signaled interest in the multicast group.

In response to determining that the selected set includes at least one ER that has signaled interest in the multicast group, the IR accesses the GMT at 510, and determines a BM for the multicast group or flow. The BM includes a bit set in each BP in the selected set corresponding to ERs that have signaled interest in the multicast group.

The IR encapsulates the BM into the multicast data packet at 512. The IR can be configured, e.g., by a network administrator, to use one of several different encapsulation methods for the BM. This depends on the network configuration and can be, for example, IP, MPLS, or some other encapsulation protocol. The BM can be encapsulated in the DA field of an IPv6 multicast data packet or can be encapsulated in an extension header. This description refers to encapsulating the BM into the multicast data packet. This terminology covers not only incorporating the BM into the multicast data packet (e.g., as header or payload information), but also appending or prepending some or all of the BM to the multicast data packet.

Figure 11:
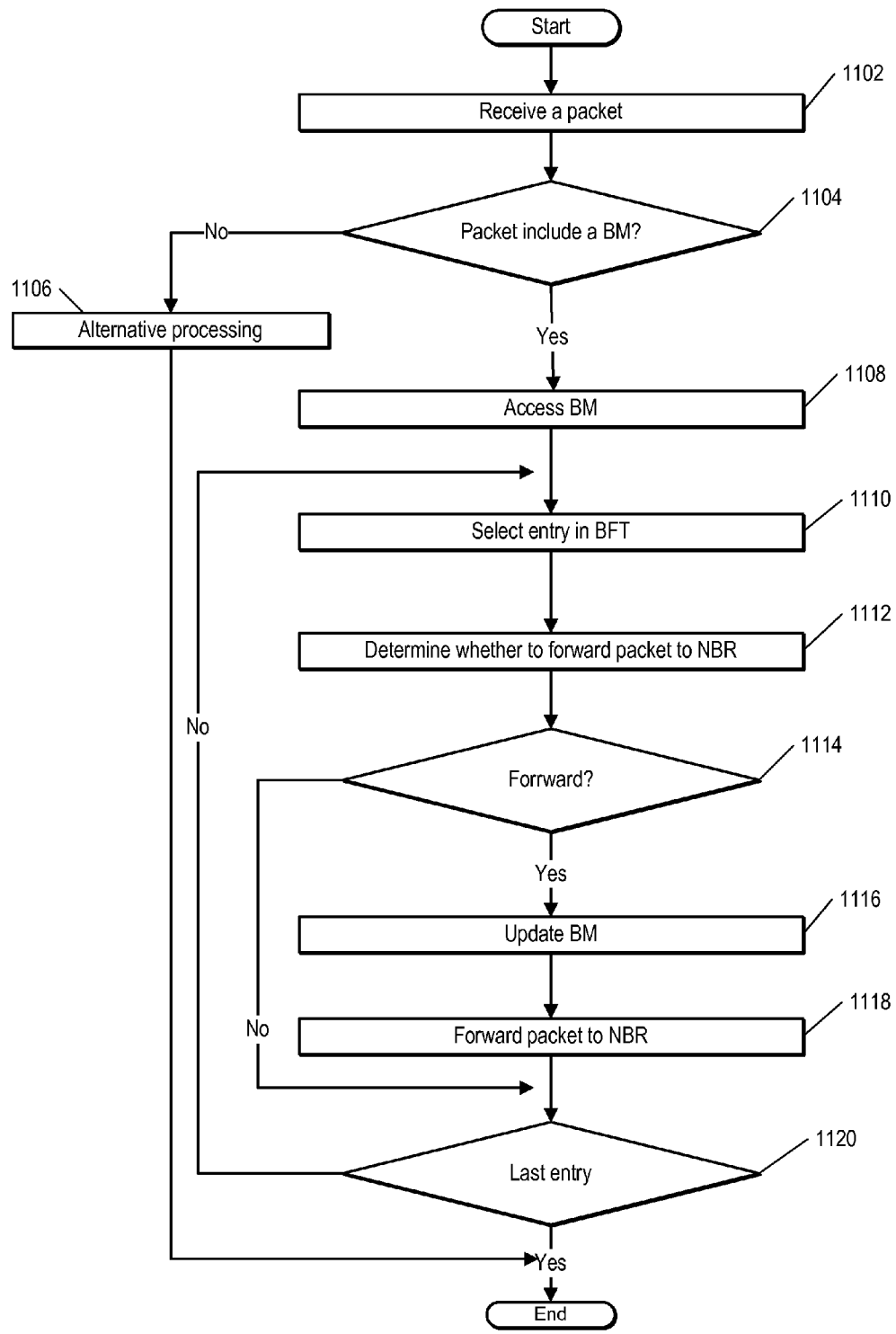
FIG. 11 is a flowchart showing an example process performed by BIER-enabled node in a BIER network.

At 514, the IR forwards the multicast data packet, including the BM. Forwarding the multicast data packet is described in greater detail with regard to FIG. 11. In one embodiment, forwarding the multicast data packet involves, accessing a bit forwarding table (BFT) maintained by the IR, and determining, based on the BM, which neighbors to send the multicast data packet to. In one embodiment, the IR performs a logical AND operation between the BM in the multicast data packet and entries in its BFT and forwards the packet to those neighbors for which the result of the AND is true.

Bit Mask Encoding

As noted, a BM includes information that identifies all of the ERs (in a given set) that have expressed interest in a multicast group (e.g., by having a bit set in the bit position corresponding to each ER that has expressed interest in the multicast group). An IR or host encapsulates the BM into the multicast data packet and forwards the multicast data packet into the BIER network. In the case of IPv6, the IR or host encapsulates the BM into the source address and/or destination address field and/or into an extension header.

Figure 6A:
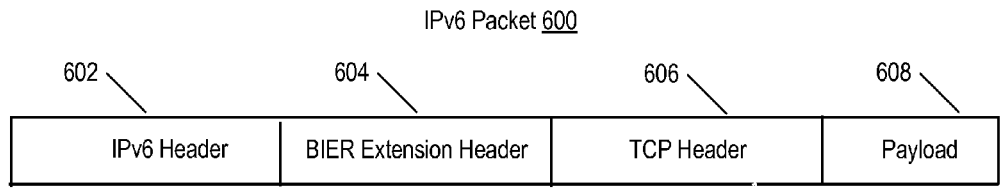
FIG. 6A is an example packet format.

FIG. 6A shows an example format of an IPv6 packet. At 602, the IPv6 packet includes an IPv6 header. The header includes control information, such as a source address and a destination address. The example of FIG. 6A shows, at 604, a BIER extension header, as described further with regard to FIG. 6C. In one embodiment, a BIER extension header is used to carry bitmask information. The IPv6 packet includes, at 606, an upper layer protocol header, such as a TCP header. At 608, payload information is included in the IPv6 packet.

Figure 6B:
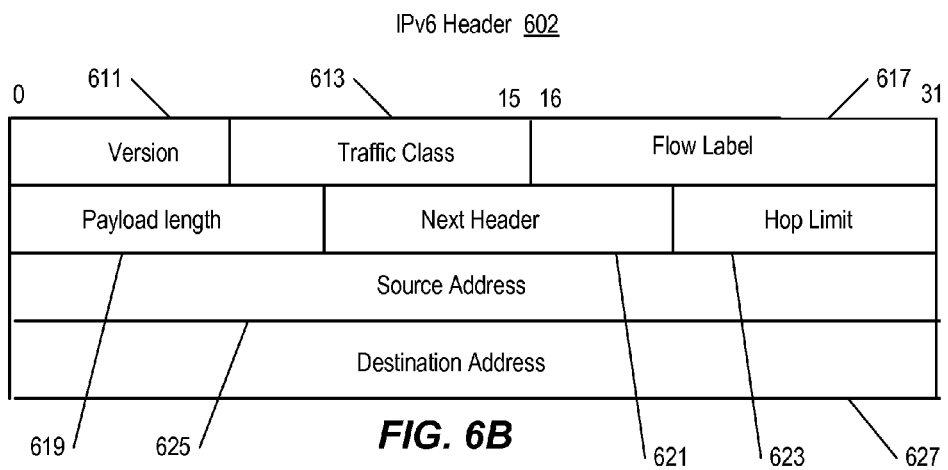
FIG. 6B is an example IPv6 header format.

FIG. 6B shows an example header, such as IPv6 header 602 of FIG. 6A. At 611, the header includes a version field, which is a 4-bit value that indicates which version of IP is in use (6 in this example). At 613, the header includes a traffic class field, which is an 8-bit value that is used to differentiate between different classes of traffic. At 617, the header includes a flow label field, which is a 20-bit value that can be used to indicate that a packet should receive special handling. At 619, the header includes a payload length field, which is a 16-bit value that indicates the length in bytes of the packet following the IPv6 header, including extension headers.

At 621, the header includes a next header field, which is an 8-bit value that indicates the type of header that follows the IPv6 header. The next header field includes a value that indicates whether an extension header is present in the packet. At 623, the header includes a hop limit field, which is an 8-bit value that indicates whether a hop count has exceeded an allowable number of hops.

At 625, the header includes a source address field, which is a 128-bit value that traditionally indicates the address of the originator of the packet. At 627, the header includes a destination address field, which is a 128-bit value that traditionally indicates the address of the intended receiver of the packet. As described with regard to FIG. 6C, some or all of the destination address and/or source address fields can be utilized for BIER information, such as a BM.

Figure 6C:
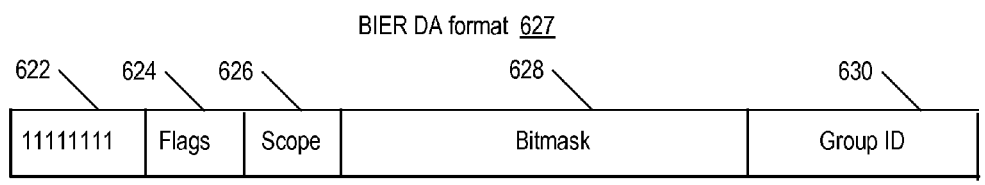
FIG. 6C is an example bit mask encoding.

FIG. 6C shows an example of using a destination address field, such as destination address 627 of FIG. 6B, to encapsulate bit mask information. At 622, the destination address includes an 8-bit field as the most significant bits of the destination address. All bits of the 8-bits are set to 1. A value of all is in the first 8-bits indicates (according to IP) that the destination address includes a multicast group address.

At 624, a 4-bit flags field is shown. In one embodiment, one or more bits of the flags field is used to indicate that the destination address includes bitmask encoding. At 626, the destination address includes a 4-bit scope field. In one embodiment, the scope field is used to encode the set identifier. Given that 4 bits are included in the scope field, 16 unique set identifiers values can be encoded in this field.

The destination address includes a 112-bit group ID field. The lower 32 bits of this field are shown as the group ID at 630, and are used to identify a multicast group with which the multicast data packet that includes the destination address is associated, or to which the multicast data packet is being sent. This leaves 80 bits, as shown at 628, which can be used to encode a bit mask. This gives capability of identifying 80 BIER-enabled nodes per set identifier. Eighty times sixteen equals one-thousand two hundred eighty (80× 16=1,280), so 1,280 ERs can be uniquely identified using an IPv6 destination address. In one embodiment, additional bits for the bitmask shown can be included in the source address of the IPv6 header. This enables bitmasks of greater length than 80 bits to be used.

Figure 6D:
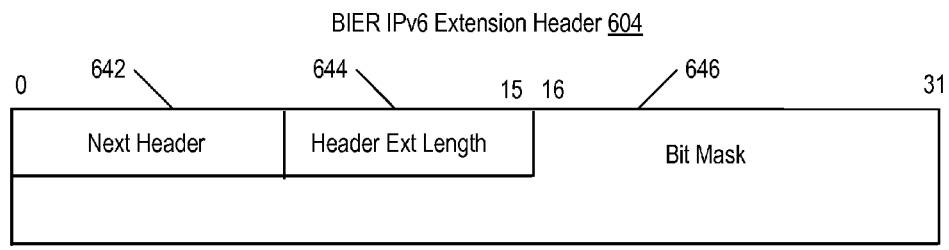
FIG. 6D is an example bit mask encoding.

FIG. 6D shows an example format of an extension header, such as BIER extension header 604 of FIG. 6A. The extension header includes, at 646, a bit mask. The bit mask can include more or fewer bits than shown in FIG. 6D. Also shown in FIG. 6D are a next header field at 642, which is an 8-bit value that indicates the type of header following the extension header, and a header extension length field at 644, which is an 8-bit value that indicates the length in bytes of the extension header, excluding the first 8 bytes.

The length of the BIER extension header is defined, e.g., by an administrator, and is advertised throughout the BIER network. The length value is consistent network wide. In one embodiment, the length field indicates that the BIER extension header is 48 bytes long. This includes a 16-byte BIER header (e.g., indicating a BM size, SI, and the like) as well as 32 bytes (256 bits) of bitmask. The length of the BIER extension header can range from 0-255 bytes, which yields a maximum bit mask length of 240 bytes, or 1,920 potential receivers). In one embodiment, the next header field 642 contains information indicating that another BIER extension header follows. An additional extension header increases the length of the BM which can be supported. In the example of two BIER extension headers, the bitmask can be 480 bytes long, which corresponds to 3,840 BPs. A multicast data packet can include multiple BIER extension headers.

BM Routing and Forwarding Tables

Each BIER-enabled node in the BIER network uses the BPs and router identifiers (RIDs) of the other BIER-enabled nodes to generate one or more bit routing tables (BRTs) and bit forwarding tables (BFTs). A bit routing table is a table that stores BP-to-router identifier mappings, e.g., as learned via the IGP. Each BIER-enabled node receives BP-to-router identifier mappings and stores them in a BRT.

Using the router identifiers, a BIER-enabled node performs a recursive lookup in unicast routing tables to identify a directly connected next hop BIER-enabled node (referred to herein as a neighbor (NBR)) on the shortest path from the BIER-enabled node toward the BIER-enabled node associated with the BP, and the interface via which the NBR is reachable. In one embodiment, the NBR is the next hop on a shortest path (SPT) towards the ER that originated the advertisement of the BP. In one embodiment, the BRT includes one entry per BP.

Figure 7:
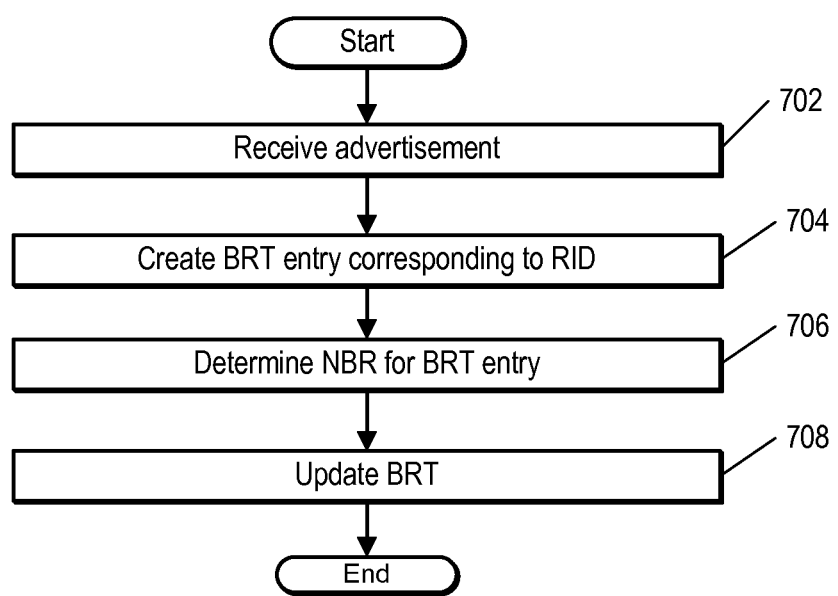
FIG. 7 is a flowchart showing an example process performed by BIER-enabled node in a BIER network.

FIG. 7 shows an example method of constructing and updating a bit routing table. In one embodiment, the method shown in FIG. 7 is performed by BIER-enabled node, such as one of the BIER-enabled nodes of FIG. 2. At 702, the BIER-enabled node receives an advertisement. In one embodiment, the advertisement includes a prefix or router ID corresponding to the BIER-enabled node that originated the advertisement. If the BIER-enabled node that originated the advertisement is an IR or an ER, the advertisement also includes information identifying a bit position and a set identifier. At 704, the BIER-enabled node that received the advertisement creates an entry in its bit routing table corresponding to the router ID from the advertisement. At 706, the BIER-enabled node determines the identity of a neighbor that should be included in the entry corresponding to the BIER-enabled node that originated the advertisement. Using the router identifiers, a BIER-enabled node performs a recursive lookup in unicast routing tables to identify a directly connected next hop BIER-enabled node (referred to herein as a neighbor (NBR)) on the shortest path from the BIER-enabled node toward the BIER-enabled node associated with the RID. The neighbor is a next hop BIER-enabled node along the shortest path towards the BIER-enabled node that originated the advertisement, that is, the BIER-enabled node corresponding to the router ID. At 708, the BIER-enabled node adds information identifying the neighbor to the entry in the bit routing table.

Using the example BIER network of FIG. 2, FIGS. 8A and 8B show BRTs constructed by BIER-enabled nodes 206 and 208, respectively. As shown in FIG. 8A, BIER-enabled node 206 constructs a bit routing table 800. Bit routing table 800 includes a column for router ID, as shown at 802. The router ID, in one embodiment, is a prefix assigned to each BIER-enabled node. BRT 800 also includes a column 804 for information identifying the set and bit position associated with the BIER-enabled node identified in the router ID column. At 806, bit routing table 800 includes a column for the neighbor. The neighbor column identifies the BIER-enabled router that is next on a path between node 206 and the BIER-enabled node identified in the RID column of the bit routing table. For example, as shown in FIG. 2, the next hop BIER-enabled node between BIER-enabled node 206 (A/32) and BIER-enabled node 214 (D/32), is BIER-enabled node 208 (B/32).

FIG. 8B shows a bit routing table for BIER-enabled node 208. Bit routing table 820, similar to bit routing table 800, includes a column 822 that includes information identifying the router IDs for each BIER-enabled node in the BRT. Bit routing table 820 includes, at 824, information identifying a set ID and bit position of the BIER-enabled node identified in the router ID column. At 826, bit routing table 820 includes a column with information identifying the next hop BIER-enabled node along a shortest path from the BIER-enabled node that generated the BRT (BIER-enabled node 208) towards the BIER-enabled node whose router ID is included in column 822.

Figure 9:
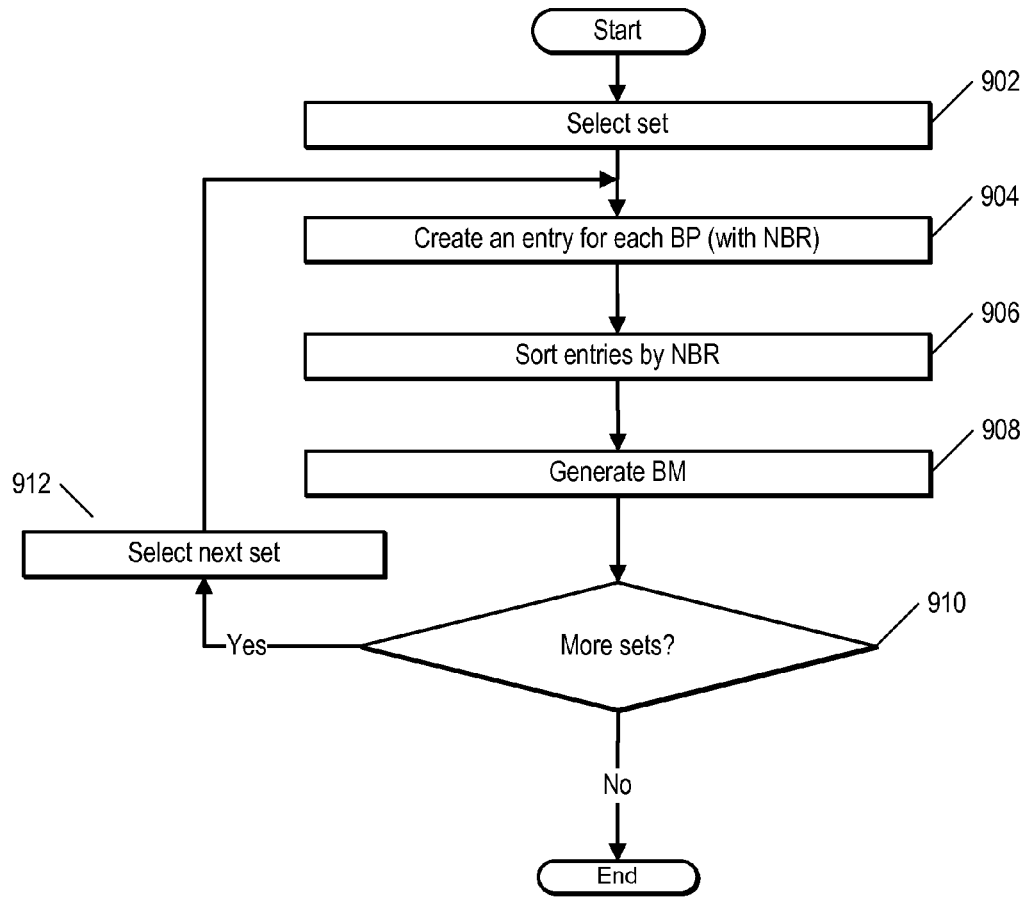
FIG. 9 is a flowchart showing an example process performed by BIER-enabled node in a BIER network.

Each BIER-enabled node translates its BRT(s) into one or more bit forwarding tables (BFTs). FIG. 9 shows an example of constructing and updating a bit forwarding table. In one embodiment, the method shown in FIG. 9 is performed by BIER-enabled node, such as one of the BIER-enabled nodes of FIG. 2. At 902, the BIER-enabled node selects a set. In one embodiment, the BIER-enabled node selects the first set for which there are BRT entries. At 904, the BIER-enabled node creates an entry in its BFT for each BP associated with the set. For example, if a BM is 259 bits long, and each of the 259 BPs in the BM is assigned to an ER in the set, the BIER-enabled node creates 259 entries. In one embodiment, each entry includes information identifying a NBR on the shortest path between the BIER-enabled node and the ER corresponding to the BP. The BIER-enabled node uses information from the BRT to identify the NBR.

In one embodiment, the BIER-enabled node sorts the entries for the set by BP at 906. At 908, the BIER-enabled node generates a BM for each entry. Generating the BM involves setting a corresponding bit in the BM for each ER that is reachable via the NBR identified in the entry. In one embodiment, the BIER-enabled node performs an OR operation between BMs that have a single bit set, the set bit corresponding to an ER reachable via the NBR. If multiple BFT entries have the same NBR, they will have identical BMs in the BFT entries. At 910, the BIER-enabled node determines whether there are additional sets. If there are additional sets, the BIER-enabled node selects the next set at 912, and the method returns to 904.

FIG. 10A shows a bit forwarding table 1040. In one embodiment, BFT 1040 is created by BIER-enabled node 206 of FIG. 4. BFT 1040 includes column 1042, which includes information identifying a set. The set column 1042 includes a value for each set in which bit positions have been assigned. In the case of FIG. 10A, set 0 and set 1 are in use by BIER-enabled node 206. FIG. 10A also includes, at 1044 a bit position column. For each set, each bit position that has been assigned to an ER has an entry. Column 1046 includes information identifying a bit mask which will be included in multicast data packets sent out from BIER-enabled node 206, those multicast data packets being intended to reach the egress routers corresponding to the bits indicated in bit position column 1044. At 1048, information identifying the neighbor along the shortest path towards the egress router corresponding to the BP identified in column 1044 is included.

Similar to bit forwarding table 1040 of FIG. 10A, bit forwarding table 1060 of FIG. 10B includes information used by a BIER-enabled node to forward multicast data packets. In one embodiment, BFT 1060 is created by BIER-enabled node 208 of FIG. 2. Bit forwarding table 1060 includes a set column 1062, a bit position column 1064, a bit mask column 1066, and a neighbor column 1068.

In the example of FIG. 10B, in response to receiving a multicast data packet with SI equal to 0, a BIER-enabled node determines how to forward the packet. Since ERs corresponding to bit position 1 (SI:BP equal to 0:1) and bit position 2 (SI:BP equal to 0:2) are reachable via C, the corresponding BPs are aggregated to form BM 0011, which the BIER-enabled node puts in the BFT entries corresponding to C. The aggregation involves, in one embodiment, performing a logical OR operation between a BM that has only the BP corresponding to the respective ER set. The ER corresponding to bit position 3 (SI:BP equal to 0:3) is reachable via A. The corresponding bit is set in the BM of the BFT. For set 1, the ER corresponding to bit position 1 (SI:BP equal to 1:1) is reachable via E.

Packet Forwarding

After encapsulating the BM into a multicast data packet, the IR forwards the multicast data packet to one or more BIER-enabled nodes using the IR's BFTS(s). An example method of forwarding a multicast data packet is described with regard to FIG. 11. The method of FIG. 11 can be performed by a BIER-enabled node, such as one of the BIER-enabled nodes of FIG. 2.

At 1102, the BIER-enabled node receives a multicast data packet. In response to receiving the multicast data packet, the BIER-enabled node determines, at 1104, whether the multicast data packet includes a bit mask. The BIER-enabled node can examine the multicast data packet header for a flag, label, or other information indicating that the multicast data packet should be forwarded using BIER. In one embodiment, the BIER-enabled node examines the flags field of the IPv6 header of the multicast data packet to determine whether a value in the flags field indicates that a BM is present in the destination address and/or source address of the IPv6 header. The BIER-enabled node can also, or in the alternative, examine the next header field of the IPv6 header to determine if the next header field indicates that a BIER extension header is included in the multicast data packet. If such information is found, the BIER-enabled node concludes that the multicast data packet includes a bit mask. If the multicast data packet does not include a bit mask, the BIER-enabled node performs alternative processing, at 1106. In one embodiment, alternative processing involves dropping the multicast data packet, or forwarding the multicast data packet using a protocol other than BIER.

In response to determining that the multicast data packet does include a bit mask, the BIER-enabled node accesses the bit mask, at 1108. In one embodiment, accessing the bit mask involves identifying an encapsulation protocol (e.g., BM in the destination address or extension header), and locating the bit mask in the multicast data packet based on the encapsulation protocol type. The BIER-enabled node determines a SI included in the multicast data packet and uses the SI to select a BFT or a portion of a BFT. For example, if an multicast data packet were received with SI equal to zero by a BIER-enabled node having the BFT shown in FIG. 10B, the BIER-enabled node would select the set of BFT entries that have SI of zero. At 1110, the BIER-enabled node selects an entry in the BIER-enabled node's BFT. In one example, the first entry in the BFT is selected and the BIER-enabled node performs an in-order traversal of the BFT, or of those entries which correspond to the SI of the multicast data packet received by the BIER-enabled node.

The BIER-enabled node determines, at 1112, whether to forward the multicast data packet to the neighbor associated with the selected BFT entry. In one embodiment, this involves performing an AND operation between the bit mask in the multicast data packet and the bit mask in the selected BFT entry. If the result of the AND operation is true, as determined at 1114, the method proceeds to 1116, and the BIER-enabled node creates a copy of the multicast data packet and updates the bit mask in the copy multicast data packet. In one embodiment, this involves performing an AND operation between the bit mask in the copy of the multicast data packet and the bit mask in the selected BFT entry and writing the results of the AND operation into the bit mask in the copy of the multicast data packet. This has the effect of clearing bits in bit positions which are not reachable via the neighbor to which the copy of the multicast data packet is being forwarded. Doing so prevents duplication or looping problems.

At 1118, the BIER-enabled node forwards the copy of the multicast data packet to the neighbor corresponding to the BFT entry. At 1120, the BIER-enabled node determines whether additional entries remain in the BFT, if so, the method returns to 1110, and the next entry in the BFT is selected. Otherwise, the method ends.

Figure 12:
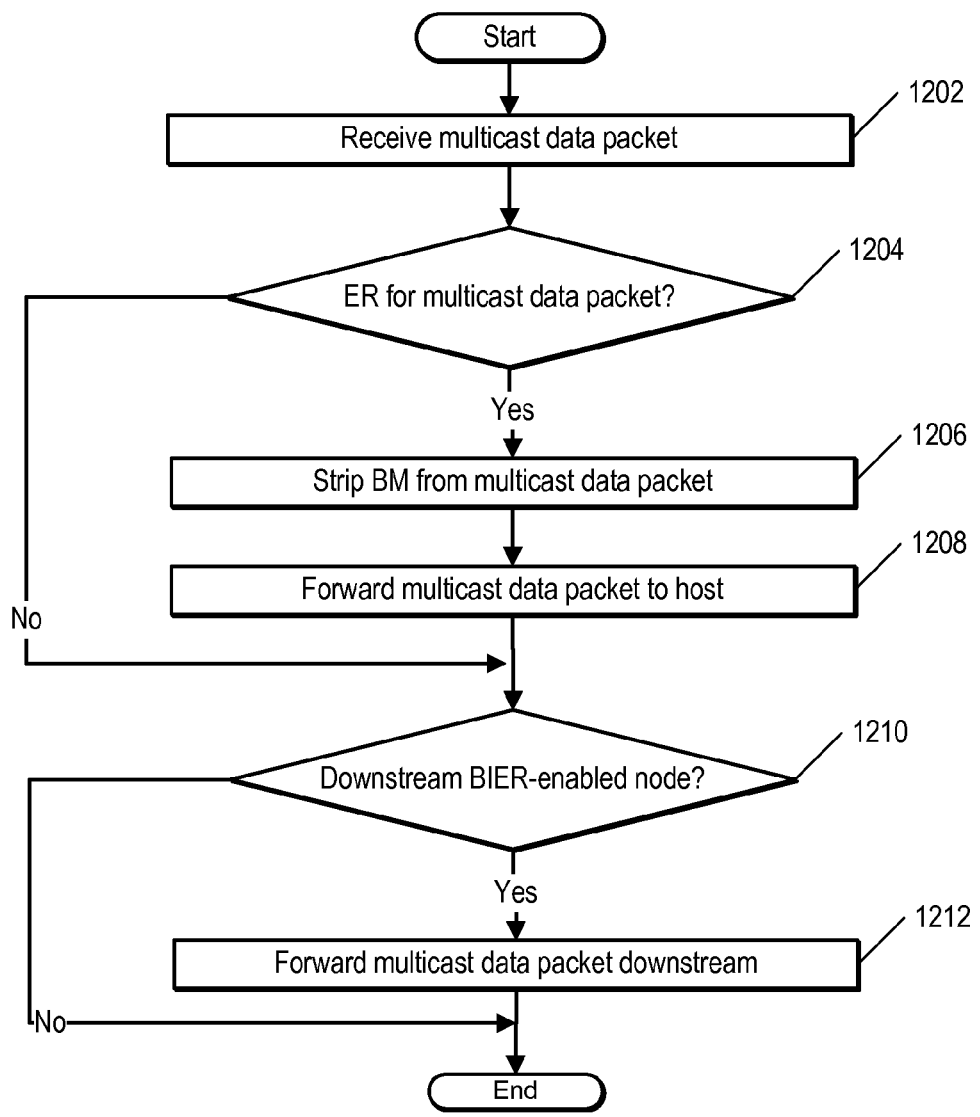
FIG. 12 is a flowchart showing an example process performed by BIER-enabled node in a BIER network.

FIG. 12 is a flowchart showing an example process performed by a BIER-enabled node in a BIER network. In one embodiment, the method is performed by an egress router (ER), such as BIER-enabled node 214 of FIG. 2. At 1202, the ER receives a multicast data packet associated with a particular multicast group. At 1204, the ER determines whether the ER is an ER for the multicast group identified in the multicast data packet, e.g., that a receiver for the multicast group is connected (directly or indirectly) to the ER. In one embodiment, determining whether the ER is an ER for the multicast group involves the ER comparing its assigned BP with the BM of the incoming multicast data packet. For example, the ER can perform an AND operation between the incoming multicast data packet's BM and a BM having only the BP corresponding to the ER set. If the BP corresponding to the ER is set to 1 in the result of the AND, the ER determines that it is an ER for the multicast data packet. In response to determining that the ER is an ER for the multicast data packet, the ER identifies one or more hosts (receivers) that have subscribed to the multicast group with which the multicast data packet is associated and forwards the packet to the hosts.

At 1206, the ER strips the BM from the multicast data packet, and performs any other decapsulation operations. In one embodiment, this involves determining an address for the receiver or a CE node. Address information identifying the receiver and/or CE node can be included in the multicast data packet. The ER forwards the multicast data packet to the host(s) at 1208.

In one embodiment, the ER determines it is not coupled to any other downstream BIER-enabled nodes, and thus the multicast data packet should not be forwarded to any other BIER-enabled nodes. To determine whether this is the case, at 1210 the ER, in one embodiment, compares the multicast data packet's BM with the ER's BFT. Based on this comparison, the ER can determine that the multicast data packet's BM does not contain any set bits that correspond to the ER's neighbors. That is, if the results of an AND between the multicast data packet's BM and each entry in the ER's BFT is all 0s, there are no downstream BIER-enabled nodes the multicast data packet should be forwarded to. If there are no downstream BIER-enabled nodes the multicast data packet should be forwarded to, the ER does not forward the multicast data packet towards any downstream BIER-enabled nodes. Otherwise, at 1212, the ER updates the multicast data packet's BM and forwards the multicast data packet. In one embodiment, the ER creates a copy of the multicast data packet and performs decapsulation and forwarding operations on the copy of the multicast data packet.

In one embodiment, a BIER-enabled node may receive a multicast data packet with a BM that includes all 0s. Such a multicast data packet is likely the result of an error, and the BIER-enabled node discards the packet. In one embodiment, an ER may not have a BFT and may be configured to automatically function as an ER (e.g., strip the BM from the packet and identify a receiver to which the multicast data packet should be forwarded) for all multicast data packet's the ER receives.

Figure 13:
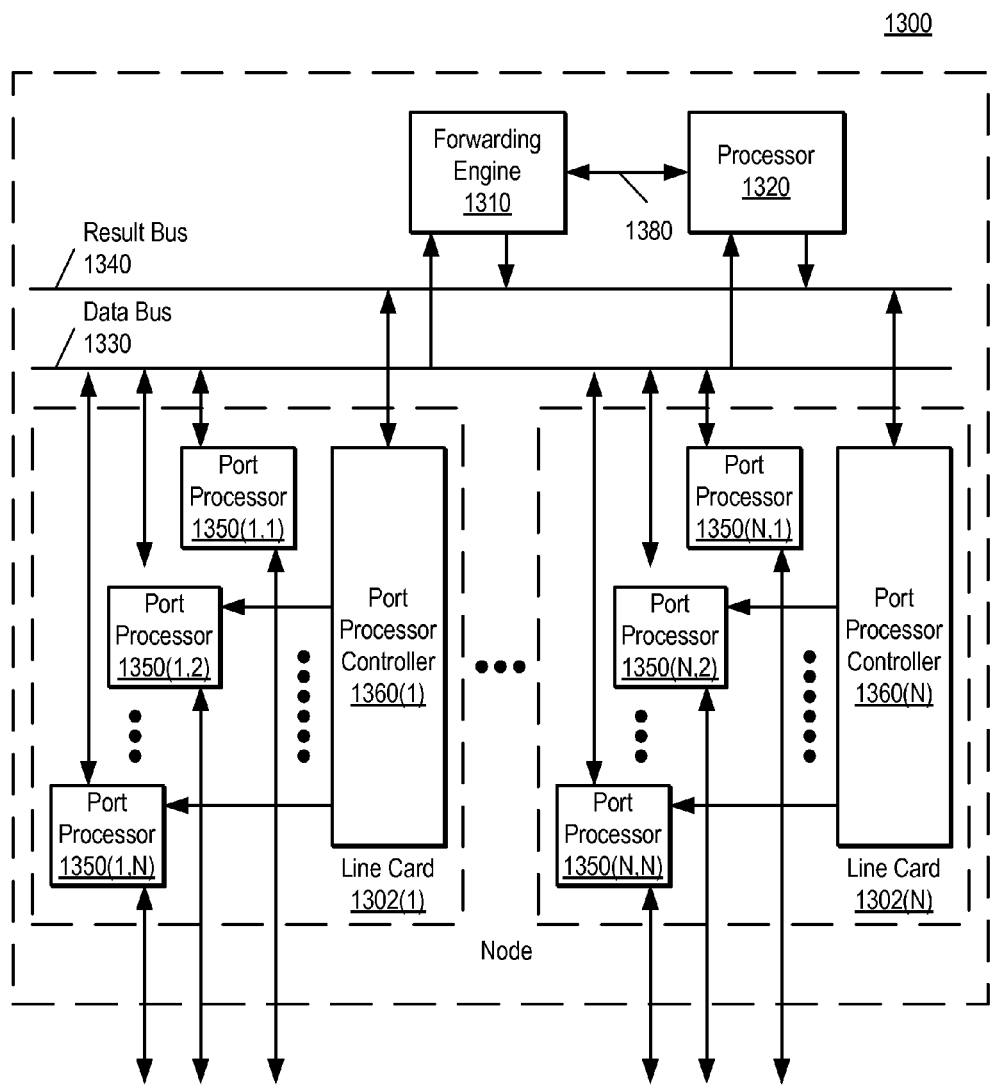
FIG. 13 is a block diagram illustrating certain components of an example node that can be employed in the network of FIG. 2.

FIG. 13 is a block diagram illustrating certain additional and/or alternative components of computing devices, such as hosts and nodes that can be employed in the networks shown in FIG. 2. In this depiction, computing device 1300 includes a number of line cards (line cards 1302(1)-(N)) that are communicatively coupled to a forwarding engine or packet forwarder 1310 and a processor 1320 via a data bus 1330 and a result bus 1340. Line cards 1302(1)-(N) include a number of port processors 1350(1,1)-(N,N) which are controlled by port processor controllers 1360(1)-(N). It will also be noted that forwarding engine 1310 and processor 1320 are not only coupled to one another via data bus 1330 and result bus 1340, but are also communicatively coupled to one another by a communications link 1380.

The processors 1350 and 1360 of each line card 1302 may be mounted on a single printed circuit board. When a packet or packet and header are received, the packet or packet and header may be identified and analyzed by router 1300 in the following manner. Upon receipt, a packet (or some or all of its control information) or packet and header is sent from the one of port processors 1350(1,1)-(N,N) at which the packet or packet and header was received to one or more of those devices coupled to data bus 1330 (e.g., others of port processors 650(1,1)-(N,N), forwarding engine 1310 and/or processor 1320). Handling of the packet or packet and header can be determined, for example, by forwarding engine 1310. For example, forwarding engine 1310 may determine that the packet or packet and header should be forwarded to one or more of port processors 1350(1,1)-(N, N). This can be accomplished by indicating to corresponding one(s) of port processor controllers 1360(1)-(N) that the copy of the packet or packet and header held in the given one(s) of port processors 1350(1,1)-(N,N) should be forwarded to the appropriate one of port processors 1350(1,1)-(N,N). In addition, or alternatively, once a packet or packet and header has been identified for processing, forwarding engine 1310, processor 1320 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a computing device receiving such a processed packet or packet and header, the corresponding process is performed to recover or validate the packet's or packet and header's information that has been thusly protected.

Figure 14:
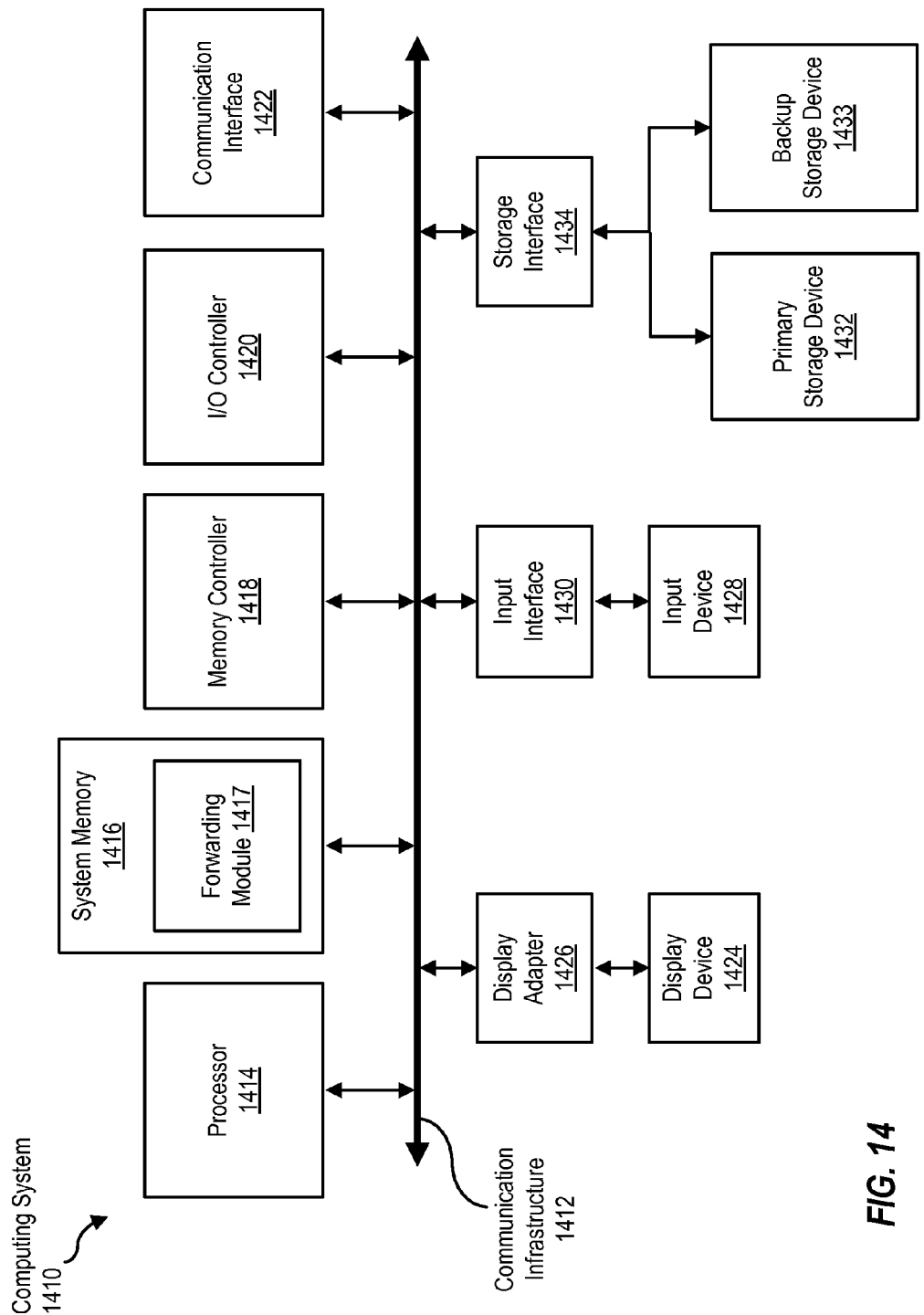
FIG. 14 is a block diagram depicting a computer system suitable for implementing embodiments of the systems described herein.

FIG. 14 is a block diagram of a computing device, illustrating how a forwarding module can be implemented in software, as described above. Computing system 1410 broadly represents any single or multi-processor computing device or system capable of executing computer-readable instructions. Examples of computing system 1410 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1410 may include at least one processor 1414 and a system memory 1416. By executing the software that implements a forwarding module 1417, computing system 1410 becomes a special purpose computing device that is configured to perform packet forwarding, in the manner described above.

Processor 1414 generally represents any type or form of processing unit capable of processing data or interpreting and executing instructions. In certain embodiments, processor 1414 may receive instructions from a software application or module. These instructions may cause processor 1414 to perform the functions of one or more of the embodiments described and/or illustrated herein. For example, processor 1414 may perform and/or be a means for performing the operations described herein. Processor 1414 may also perform and/or be a means for performing any other operations, methods, or processes described and/or illustrated herein.

System memory 1416 generally represents any type or form of volatile or non-volatile storage device or medium capable of storing data and/or other computer-readable instructions. Examples of system memory 1416 include, without limitation, random access memory (RAM), read only memory (ROM), flash memory, or any other suitable memory device. Although not required, in certain embodiments computing system 1410 may include both a volatile memory unit (such as, for example, system memory 1416) and a non-volatile storage device (such as, for example, primary storage device 1432, as described in detail below). In one example, program instructions executable to implement a forwarding module configured to forward multicast data packets may be loaded into system memory 1416.

In certain embodiments, computing system 1410 may also include one or more components or elements in addition to processor 1414 and system memory 1416. For example, as illustrated in FIG. 14, computing system 1410 may include a memory controller 1418, an Input/Output (I/O) controller 1420, and a communication interface 1422, each of which may be interconnected via a communication infrastructure 1412. Communication infrastructure 1414 generally represents any type or form of infrastructure capable of facilitating communication between one or more components of a computing device. Examples of communication infrastructure 1414 include, without limitation, a communication bus (such as an Industry Standard Architecture (ISA), Peripheral Component Interconnect (PCI), PCI express (PCIe), or similar bus) and a network.

Memory controller 1418 generally represents any type or form of device capable of handling memory or data or controlling communication between one or more components of computing system 1410. For example, in certain embodiments memory controller 1418 may control communication between processor 1414, system memory 1416, and I/O controller 1420 via communication infrastructure 1414. In certain embodiments, memory controller 1418 may perform and/or be a means for performing, either alone or in combination with other elements, one or more of the operations or features described and/or illustrated herein.

I/O controller 1420 generally represents any type or form of module capable of coordinating and/or controlling the input and output functions of a computing device. For example, in certain embodiments I/O controller 1420 may control or facilitate transfer of data between one or more elements of computing system 1410, such as processor 1414, system memory 1416, communication interface 1422, display adapter 1426, input interface 1430, and storage interface 1434.

Communication interface 1422 broadly represents any type or form of communication device or adapter capable of facilitating communication between computing system 1410 and one or more additional devices. For example, in certain embodiments communication interface 1422 may facilitate communication between computing system 1410 and a private or public network including additional computing systems. Examples of communication interface 1422 include, without limitation, a wired network interface (such as a network interface card), a wireless network interface (such as a wireless network interface card), a modem, and any other suitable interface. In at least one embodiment, communication interface 1422 may provide a direct connection to a remote server via a direct link to a network, such as the Internet. Communication interface 1422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1422 may also represent a host adapter configured to facilitate communication between computing system 1410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1422 may also allow computing system 1410 to engage in distributed or remote computing. For example, communication interface 1422 may receive instructions from a remote device or send instructions to a remote device for execution.

As illustrated in FIG. 14, computing system 1410 may also include at least one display device 1424 coupled to communication infrastructure 1414 via a display adapter 1426. Display device 1424 generally represents any type or form of device capable of visually displaying information forwarded by display adapter 1426. Similarly, display adapter 1426 generally represents any type or form of device configured to forward graphics, text, and other data from communication infrastructure 1414 (or from a frame buffer) for display on display device 1424.

As illustrated in FIG. 14, computing system 1410 may also include at least one input device 1428 coupled to communication infrastructure 1414 via an input interface 1430. Input device 1428 generally represents any type or form of input device capable of providing input, either computer or human generated, to computing system 1410. Examples of input device 1428 include, without limitation, a keyboard, a pointing device, a speech recognition device, or any other input device.

As illustrated in FIG. 14, computing system 1410 may also include a primary storage device 1432 and a backup storage device 1433 coupled to communication infrastructure 1414 via a storage interface 1434. Storage devices 1432 and 1433 generally represent any type or form of storage device or medium capable of storing data and/or other computer-readable instructions. For example, storage devices 1432 and 1433 may be a magnetic disk drive (e.g., a so-called hard drive), a floppy disk drive, a magnetic tape drive, an optical disk drive, a flash drive, or the like. Storage interface 1434 generally represents any type or form of interface or device for transferring data between storage devices 1432 and 1433 and other components of computing system 1410. A storage device like primary storage device 1432 can store information such as routing tables and forwarding tables.

In certain embodiments, storage devices 1432 and 1433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1432 and 1433 may also include other similar structures or devices for allowing computer software, data, or other computer-readable instructions to be loaded into computing system 1410. For example, storage devices 1432 and 1433 may be configured to read and write software, data, or other computer-readable information. Storage devices 1432 and 1433 may also be a part of computing system 1410 or may be a separate device accessed through other interface systems.

Many other devices or subsystems may be connected to computing system 1410. Conversely, all of the components and devices illustrated in FIG. 14 need not be present to practice the embodiments described and/or illustrated herein. The devices and subsystems referenced above may also be interconnected in different ways from that shown in FIG. 14.

Computing system 1410 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1410 for storage in memory via a network such as the Internet or upon a carrier medium.

The computer-readable medium containing the computer program may be loaded into computing system 1410. All or a portion of the computer program stored on the computer-readable medium may then be stored in system memory 1416 and/or various portions of storage devices 1432 and 1433. When executed by processor 1414, a computer program loaded into computing system 1410 may cause processor 1414 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1410 may be configured as an application specific integrated circuit (ASIC) adapted to implement one or more of the embodiments disclosed herein.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
  receiving a packet at a node in a network of nodes, wherein
    the packet comprises an internet protocol version six (IPv6) destination address field, wherein the IPv6 IP destination address field comprises a multicast forwarding entry and a multicast group identification,
    the multicast forwarding entry comprises a bit mask, and each bit of the bit mask corresponds to a respective edge node of the network;
    the multicast group identification can be used to identify a multicast group of hosts to which the packet is being sent;
  comparing the bit mask with forwarding information stored by the node;
  selecting at least one neighbor node based on the comparing;
  forwarding the packet to the at least one neighbor node;
  receiving a first advertisement at the node, wherein the node receives the first advertisement from a first edge node of the network, and wherein the first advertisement comprises first information identifying a first bit position in the bit mask and the first edge node;
  receiving a second advertisement at the node, wherein the node receives the second advertisement from a second edge node of the network, and wherein the second advertisement comprises second information identifying a second bit position in the bit mask and the second edge node;
  generating the forwarding information at the node, wherein the forwarding information is generated based on the first information and the second information, and;
  storing the forwarding information at the node.

2. The method of claim 1, further comprising:
  updating the multicast forwarding entry before the packet is forwarded, wherein
    the updating the multicast forwarding entry comprises clearing a bit of the bit mask.

3. The method of claim 2, further comprising:
  selecting the forwarding information stored by the node, wherein
    the selecting the forwarding information is based on a set identifier value encoded in the multicast forwarding entry.

4. The method of claim 1, wherein
the comparing comprises performing a logical AND operation between the bit mask and a portion the forwarding information.

5. The method of claim 1, wherein
the multicast forwarding entry comprises a set identifier.

6. A system comprising:
  a first node configured to
    receive a packet, wherein
      the packet comprises an internet protocol version six (IPv6) destination address field, wherein the IPv6 destination address field comprises a multicast forwarding entry and a multicast group identification,
      the multicast forwarding entry comprises a bit mask, and each bit of the bit mask corresponds to a respective edge node of a network of nodes;
      the multicast group identification can be used to identify a multicast group of hosts to which the packet is being sent;
    receive a first advertisement from a first edge node of the network, wherein the first advertisement comprises first information identifying a first bit position in the bit mask and the first edge node;
    receive a second advertisement from a second edge node of the network, wherein the second advertisement comprises second information identifying a second bit position in the bit mask and the second edge node;
    generate forwarding information, wherein the forwarding information is generated based on the first information and the second information;
    storing the forwarding information;
    compare the bit mask with the forwarding information stored by the node;
    select at least one neighbor node based on the comparing; and
    forward the packet to the at least one neighbor node.

7. The system of claim 6, wherein the first node is further configured to:

update the multicast forwarding entry before forwarding the packet, wherein updating the multicast forwarding entry comprises clearing a bit of the bit mask.

8. The system of claim 6, wherein the node is further configured to:
select the forwarding information stored by the node, wherein
the selecting the forwarding information is based on a set identifier value encoded in the multicast forwarding entry.

9. A non-transitory computer readable storage medium comprising executable instructions, wherein a method is implemented in a node of a network of nodes, wherein the method is implemented in response to executing the instructions, the method comprising:
receiving a packet, wherein
the packet comprises an internet protocol version 6 (IPv6) destination address field, wherein the Iv6P destination address field comprises a multicast forwarding entry and a multicast group identification,
the multicast forwarding entry comprises a bit mask, and each bit of the bit mask corresponds to a respective edge node of the network of nodes;
the multicast group identification can be used to identify a multicast group of hosts to which the packet is being sent;
receive a first advertisement from a first edge node of the network, wherein the first advertisement comprises first information identifying a first bit position in the bit mask and the first edge node;
receive a second advertisement from a second edge node of the network, wherein the second advertisement comprises second information identifying a second bit position in the bit mask and the second edge node;
generate forwarding information, wherein the forwarding information is generated based on the first information and the second information;
storing the forwarding information;
comparing the bit mask with the forwarding information stored by the node;
selecting at least one neighbor node based on the comparing; and
forwarding the packet to the at least one neighbor node.

10. The non-transitory computer readable storage medium of claim 9, wherein the method further comprises:
updating the multicast forwarding entry before forwarding the packet, wherein
the updating the multicast forwarding entry comprises clearing a bit of the bit mask.

11. The non-transitory computer readable storage medium of claim 9, wherein the method further comprises:
selecting the forwarding information stored by the node, wherein
the selecting the forwarding information is based on a set identifier value encoded in the multicast forwarding entry.

* * * * *